US008267776B2

(12) United States Patent
Ajiro et al.

(10) Patent No.: US 8,267,776 B2
(45) Date of Patent: Sep. 18, 2012

(54) GAMING MACHINE INCLUDING TERMINALS AND PLAYING METHOD THEREOF

(75) Inventors: Arata Ajiro, Tokyo (JP); Yoichi Kato, Tokyo (JP); Kenta Sugano, Tokyo (JP)

(73) Assignee: Aruze Corp., Tokyo (JP)

( * ) Notice: Subject to any disclaimer, the term of this patent is extended or adjusted under 35 U.S.C. 154(b) by 1051 days.

(21) Appl. No.: 12/193,592

(22) Filed: Aug. 18, 2008

(65) Prior Publication Data

US 2009/0291737 A1 Nov. 26, 2009

Related U.S. Application Data

(60) Provisional application No. 61/054,689, filed on May 20, 2008.

(51) Int. Cl.

| | |
|---|---|
| ***A63F 9/24*** | (2006.01) |
| ***A63F 13/00*** | (2006.01) |
| ***A63F 1/18*** | (2006.01) |
| ***G06F 17/00*** | (2006.01) |
| ***G06F 19/00*** | (2011.01) |
| ***A63B 71/00*** | (2006.01) |

(52) U.S. Cl. ................ 463/27; 463/16; 463/20; 463/25; 463/42; 273/143 R

(58) Field of Classification Search .................... 463/16, 463/20, 25, 27, 42; 273/143 R
See application file for complete search history.

(56) References Cited

U.S. PATENT DOCUMENTS

| | | | | |
|---|---|---|---|---|
| 4,283,709 | A | 8/1981 | Lucero et al. | |
| 5,664,998 | A * | 9/1997 | Seelig et al. | 463/20 |
| 5,820,459 | A | 10/1998 | Acres et al. | |
| 6,003,013 | A | 12/1999 | Boushy et al. | |
| 6,142,872 | A | 11/2000 | Walker et al. | |
| 6,203,429 | B1 * | 3/2001 | Demar et al. | 463/20 |
| 6,312,332 | B1 | 11/2001 | Walker et al. | |
| 6,361,441 | B1 | 3/2002 | Walker et al. | |
| 6,416,409 | B1 * | 7/2002 | Jordan | 463/27 |
| 6,733,390 | B2 | 5/2004 | Walker et al. | |
| 7,393,280 | B2 * | 7/2008 | Cannon | 463/42 |
| 2002/0042296 | A1 | 4/2002 | Walker et al. | |
| 2002/0151365 | A1 * | 10/2002 | Walker et al. | 463/42 |
| 2002/0151367 | A1 | 10/2002 | Ishida | |
| 2003/0119580 | A1 * | 6/2003 | McClintic et al. | 463/25 |
| 2004/0048662 | A1 * | 3/2004 | Ulmer | 463/30 |
| 2008/0113708 | A1 | 5/2008 | Beadell et al. | |

FOREIGN PATENT DOCUMENTS

| | | |
|---|---|---|
| CA | 2278897 | 7/1999 |
| CN | 1378871 A | 11/2002 |

* cited by examiner

*Primary Examiner* — Peter DungBa Vo
*Assistant Examiner* — Wei Li
(74) *Attorney, Agent, or Firm* — Sheppard, Mullin, Richter & Hampton LLP

(57) ABSTRACT

A gaming machine includes: a base game; gaming terminals; a bonus game configured to award a bonus payout more rewarding than the payout in the base game; a bonus payout indicator that displays the bonus payout; and paths, respectively corresponding to the gaming terminals, including light emitting portions arranged to form a channel extending from a position corresponding to each gaming terminal to the bonus payout indicator. In each gaming terminal, the base game is run independently from the other gaming terminals. The bonus game is run. A random number of the light emitting portions are activated toward the bonus payout indicator in a path corresponding to a gaming terminal in which a predetermined winning is met, every time the predetermined winning is met in the gaming terminals. The bonus payout is awarded in a gaming terminal corresponding to a path in which the light emitting portions turned active up to the bonus payout indicator.

7 Claims, 19 Drawing Sheets

FIG. 8

| | DISPLAY WINDOW151 | DISPLAY WINDOW152 | DISPLAY WINDOW153 | DISPLAY WINDOW154 | DISPLAY WINDOW155 |
|---|---|---|---|---|---|
| CODE NO. | SYMBOL | SYMBOL | SYMBOL | SYMBOL | SYMBOL |
| 00 | Angelfish | Tuna | Tuna | Coelacanth | Clownfish |
| 01 | Clownfish | Coelacanth | Tuna | Angelfish | Tuna |
| 02 | Angelfish | Tuna | Angelfish | Clownfish | Angelfish |
| 03 | Clownfish | Coelacanth | Tuna | BONUS | Coelacanth |
| 04 | Angelfish | Tuna | Angelfish | Coelacanth | Clownfish |
| 05 | Clownfish | Angelfish | Clownfish | Clownfish | 7 |
| 06 | Angelfish | Clownfish | Angelfish | Tuna | Angelfish |
| 07 | Clownfish | Tuna | Clownfish | 7 | Tuna |
| 08 | 7 | Coelacanth | Angelfish | Clownfish | Clownfish |
| 09 | Tuna | Tuna | Clownfish | Angelfish | Coelacanth |
| 10 | Angelfish | Coelacanth | Angelfish | Coelacanth | Tuna |
| 11 | Coelacanth | BONUS | Clownfish | Angelfish | Clownfish |
| 12 | Angelfish | Clownfish | Coelacanth | Clownfish | Coelacanth |
| 13 | BONUS | 7 | BONUS | Tuna | Angelfish |
| 14 | 7 | Coelacanth | 7 | Tuna | Tuna |
| 15 | Angelfish | Tuna | Coelacanth | BONUS | Clownfish |
| 16 | Tuna | Coelacanth | Tuna | Tuna | Tuna |
| 17 | Clownfish | BONUS | Clownfish | Coelacanth | Angelfish |
| 18 | Angelfish | Clownfish | Angelfish | Clownfish | Coelacanth |
| 19 | Clownfish | Tuna | Clownfish | Angelfish | Angelfish |
| 20 | 7 | Coelacanth | Angelfish | Tuna | Clownfish |
| 21 | Tuna | Tuna | Clownfish | Clownfish | BONUS |

FIG. 9

PATH TABLE

| PATH | NUMBER OF LIGHT EMITTING PORTIONS |
|---|---|
| PATH 301a | 100 |
| PATH 301b | 110 |
| PATH 301c | 120 |
| ...... | ...... |
| PATH 301j | 100 |

FIG. 10

PATH ACTIVATION STATE TABLE

| PATH | NUMBERS ACTIVATED | NUMBERS YET TO BE ACTIVATED | NUMBER OF WINNINGS | REMAINING NUMBER OF WINNINGS |
|---|---|---|---|---|
| PATH 301a | 10 | 90 | 1 | 4 |
| PATH 301b | 0 | 110 | 0 | 5 |
| PATH 301c | 100 | 20 | 4 | 1 |
| ...... | ...... | ...... | ...... | ...... |
| PATH 301j | 30 | 70 | 1 | 4 |

INITIAL PROCESS

BASE GAME PAYOUT TABLE

| NUMBER OF BETS | WINNING | AMOUNT OF PAYOUT |
|---|---|---|
| 2 | BAR BAR BAR / BAR BAR BAR / BAR BAR BAR | 120 |
| 2 | BAR BAR / BAR BAR / BAR BAR | 80 |
| 2 | BAR BAR BAR | 40 |
| 2 | ANY BAR ANY BAR ANY BAR | 20 |
| 2 | BLANK BLANK BLANK | 2 |
| .... | ........... | .... |

FIG.18
BASE GAME PAYOUT TABLE
| NUMBER OF BETS | WINNING | AMOUNT OF PAYOUT |
|---|---|---|
| 1 | BAR<br>BAR<br>BAR BAR<br>BAR<br>BAR BAR<br>BAR<br>BAR | 60 |
| 1 | BAR<br>BAR BAR<br>BAR BAR<br>BAR | 40 |
| 1 | BAR BAR BAR | 20 |
| 1 | ANY<br>BAR ANY<br>BAR ANY<br>BAR | 10 |
| 1 | BLANK BLANK BLANK | 1 |
| 2 | BAR<br>BAR<br>BAR BAR<br>BAR<br>BAR BAR<br>BAR<br>BAR | 120 |
| 2 | BAR<br>BAR BAR<br>BAR BAR<br>BAR | 80 |
| 2 | BAR BAR BAR | 40 |
| 2 | ANY<br>BAR ANY<br>BAR ANY<br>BAR | 20 |
| 2 | BLANK BLANK BLANK | 2 |
| 3 |  | 1800 |
| 3 |  | 100 |
| 3 |  | 100 |

FIG.20
BONUS GAME PAYOUT TABLE
| WINNING | PAYOUT POINTS |
|---|---|
| 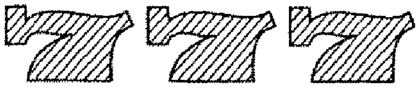 | 7000 |
|  | 300 |
|  | 150 |
| BAR<br>BAR<br>BAR | 30 |
| BAR<br>BAR | 20 |
| BAR | 10 |

GAMING MACHINE INCLUDING TERMINALS AND PLAYING METHOD THEREOF

CROSS REFERENCE TO RELATED APPLICATION

The present application claims priority from U.S. Provisional Application No. 61/054,689, which was filed on May 20, 2008, which application is incorporated herein by reference in its entirety.

BACKGROUND OF THE INVENTION

1. Field of the Invention

The present invention relates to a gaming machine and a playing method thereof.

2. Description of Related Art

Among existing gaming machines, there is a gaming machine including: two or more gaming terminals; terminal controllers respectively provided to the gaming terminal, each of which controllers causes associated one of the gaming terminals to run a game; a center controller for controlling all the terminal controllers. Such gaming machines are disclosed in, for example, specifications of U.S. Patent Application Publication No. 2002/0042296, U.S. Pat. No. 6,733,390, U.S. Pat. No. 6,312,332, U.S. Pat. No. 6,142,872, U.S. Pat. No. 6,361,441, U.S. Pat. No. 5,820,459, U.S. Pat. No. 4,283,709, and U.S. Pat. No. 6,003,013. A terminal controller of a gaming terminal runs a game and awards a payout based on the result of the game independently from another terminal controller of another gaming terminal. The center controller provides a bonus game, in which two or more players compete against one another for various jackpots, such as progressive jackpots or mystery jackpots, through the gaming terminals.

An object of the invention is to provide a gaming machine providing an entertainment characteristic which is not brought about by the above mentioned known art, and a playing method thereof.

SUMMARY OF THE INVENTION

The present invention is a gaming machine including: a base game configured to award a payout according to a predetermined winning; a plurality of gaming terminals each including a terminal controller programmed to perform operations (a1) and (a2); a bonus game configured to award a bonus payout more rewarding than the payout in the base game; a bonus payout indicator that displays the bonus payout; a plurality of paths, respectively corresponding to the gaming terminals, each including a plurality of light emitting portions arranged to form a channel extending from a position corresponding to each gaming terminal to the bonus payout indicator; and a center controller programmed to perform operations (b1) through (b3), the terminal controller in each gaming terminal (a1) running the base game independently from the other gaming terminals and awarding the payout according to a predetermined winning, and (a2) awarding the bonus payout based on an instruction from the center controller, and the center controller (b1) running the bonus game based on a predetermined condition, (b2) activating a random number of the light emitting portions toward the bonus payout indicator in a path corresponding to a gaming terminal in which a predetermined winning is met, every time the predetermined winning is met in the gaming terminals, and (b3) instructing the terminal controller of the gaming terminal, corresponding to a path in which the light emitting portions turned active up to the bonus payout indicator, to award the bonus payout.

According to this configuration, each gaming terminal runs the base game independently from the other gaming terminals, and awards the payout according to a predetermined winning. The bonus game configured to award a bonus payout more rewarding than the payout in the base game is run based on a predetermined condition. Every time a predetermined winning is met in a gaming terminal, a random number of the light emitting portions are activated toward the bonus payout indicator in a path corresponding to the gaming terminal in which the winning has occurred. A bonus payout is awarded in the gaming terminal corresponding to the path including the light emitting portions that became active all the way up to the bonus payout indicator. Because the light emitting portions turn active toward the bonus payout indicator in random numbers when a predetermined winning is met, the players cannot easily predict which path contains the light emitting portions that reach the bonus payout indicator first by activation. That is, a new kind of entertainment is provided.

As used herein, the term "active" means a lighting or flashing state of the light emitting portions.

The present invention is a gaming machine including: a base game configured to award a payout according to a predetermined winning; a plurality of gaming terminals each including a terminal controller programmed to perform operations (c1) and (c2); a bonus game configured to award a bonus payout more rewarding than the payout in the base game; a bonus payout indicator that displays the bonus payout; a plurality of paths, respectively corresponding to the gaming terminals, each including a plurality of light emitting portions arranged to form a channel extending from a position corresponding to each gaming terminal to the bonus payout indicator; and a center controller programmed to perform operations (d1) through (d3), the terminal controller in each gaming terminal (c1) running the base game independently from the other gaming terminals and awarding the payout according to a predetermined winning, and (c2) awarding the bonus payout based on an instruction from the center controller, and the center controller (d1) running the bonus game based on a predetermined condition, (d2) activating a random number of the light emitting portions toward the bonus payout indicator in a path corresponding to a gaming terminal in which a predetermined winning is met, every time the predetermined winning is met in the gaming terminals, such that the predetermined number of winnings required to activate the light emitting portions up to the bonus payout indicator is the same for all of the paths, and (d3) instructing the terminal controller of the gaming terminal, corresponding to a path in which the light emitting portions turned active up to the bonus payout indicator, to award the bonus payout.

According to this configuration, each gaming terminal runs the base game independently from the other gaming terminals, and awards the payout according to a predetermined winning. The bonus game configured to award a bonus payout more rewarding than the payout in the base game is run based on a predetermined condition. A random number of light emitting portions are activated toward the bonus payout indicator in a path corresponding to the gaming terminal in which a predetermined winning has occurred, every time the predetermined winning is met in the gaming terminals, such that the predetermined number of winnings required to activate the light emitting portions up to the bonus payout indicator is the same for all paths. A bonus payout is awarded in the gaming terminal corresponding to the path including the light emitting portions that became active all the way up to the bonus payout indicator. Because the light emitting portions turn active toward the bonus payout indicator in random numbers when a predetermined winning is met, the players cannot easily predict which path contains the light emitting portions that reach the bonus payout indicator first by activation. That is, a new kind of entertainment is provided. Further, because the light emitting portions turn active in random numbers such that the predetermined number of winnings required to activate the light emitting portions up to the bonus payout indicator is the same for all paths 301, the difficulty of activating the light emitting portions to the bonus payout indicator (winning percentage of a bonus game) is perceived as being different in each path, while it is actually the same for all paths. That is, a new kind of entertainment is provided.

The present invention is a gaming machine including: a base game configured to award a payout according to a predetermined winning; a plurality of gaming terminals each including a terminal controller programmed to perform operations (e1) and (e2); a bonus game configured to award a bonus payout more rewarding than the payout in the base game; a bonus payout indicator that displays the bonus payout; a plurality of paths, respectively corresponding to the gaming terminals, each including a plurality of light emitting portions arranged along a width direction of the path and forming a channel extending from a position corresponding to each gaming terminal to the bonus payout indicator; and a center controller programmed to perform operations (f1) through (f3), the terminal controller in each gaming terminal (e1) running the base game independently from the other gaming terminals and awarding the payout according to a predetermined winning, and (e2) awarding the bonus payout based on an instruction from the center controller, and the center controller (f1) running the bonus game based on a predetermined condition, (f2) activating a random number of the light emitting portions toward the bonus payout indicator in a path corresponding to a gaming terminal in which a predetermined winning is met, every time the predetermined winning is met in the gaming terminals, and (f3) instructing the terminal controller of the gaming terminal, corresponding to a path in which the light emitting portions turned active up to the bonus payout indicator, to award the bonus payout.

According to this configuration, each gaming terminal runs the base game independently from the other gaming terminals, and awards the payout according to a predetermined winning. The bonus game configured to award a bonus payout more rewarding than the payout in the base game is run based on a predetermined condition. Every time a predetermined winning is met in a gaming terminal, a random number of the light emitting portions are activated toward the bonus payout indicator in a path corresponding to the gaming terminal in which the winning has occurred. A bonus payout is awarded in the gaming terminal corresponding to the path including the light emitting portions that became active all the way up to the bonus payout indicator. Because the light emitting portions turn active toward the bonus payout indicator in random numbers when a predetermined winning is met, the players cannot easily predict which path contains the light emitting portions that reach the bonus payout indicator first by activation. That is, a new kind of entertainment is provided. Further, because more than one light emitting portion 303 is disposed along the width direction of the path, the light emitting portions can be activated in a wide variety of patterns. That is, a new kind of entertainment is provided.

The present invention is a playing method of a gaming machine including a plurality of gaming terminals, the method including the steps of: (g1) running a base game configured to award a payout according to a predetermined winning and awarding the payout according to a predetermined winning, the base game being run in each of the gaming terminals, independently from the other gaming terminals; (g2) running a bonus game configured to award a payout more rewarding than the payout in the base game, based on a predetermined condition; (g3) activating a random number of light emitting portions toward the bonus payout indicator in a path corresponding to a gaming terminal in which a predetermined winning is met, every time the predetermined winning is met in the gaming terminals, the path including a plurality of light emitting portions arranged to form a channel extending from a position corresponding to each gaming terminal to the bonus payout indicator displaying the bonus payout; and (g4) awarding the bonus payout in the gaming terminal corresponding to a path in which the light emitting portions turned active up to the bonus payout indicator.

According to this arrangement, because the light emitting portions turn active toward the bonus payout indicator in random numbers when a predetermined winning is met, the players cannot easily predict which path contains the light emitting portions that reach the bonus payout indicator first by activation. That is, a new kind of entertainment is provided.

BRIEF DESCRIPTION OF THE DRAWINGS

FIG. 8 is an explanatory diagram illustrating a symbol column of symbols rearranged on a terminal display.

FIG. 9 is a diagram showing a path table.

FIG. 10 is a diagram showing a path activation state table.

FIG. 18 is a diagram showing a base game payout table in a gaming machine according to another embodiment of the present invention.

FIG. 20 is an explanatory diagram showing a bonus game payout table in a gaming machine according to another embodiment of the present invention.

DESCRIPTION OF THE PREFERRED EMBODIMENTS

The following describes an embodiment of a gaming machine and a playing method thereof according to the present invention.

Figure 1:
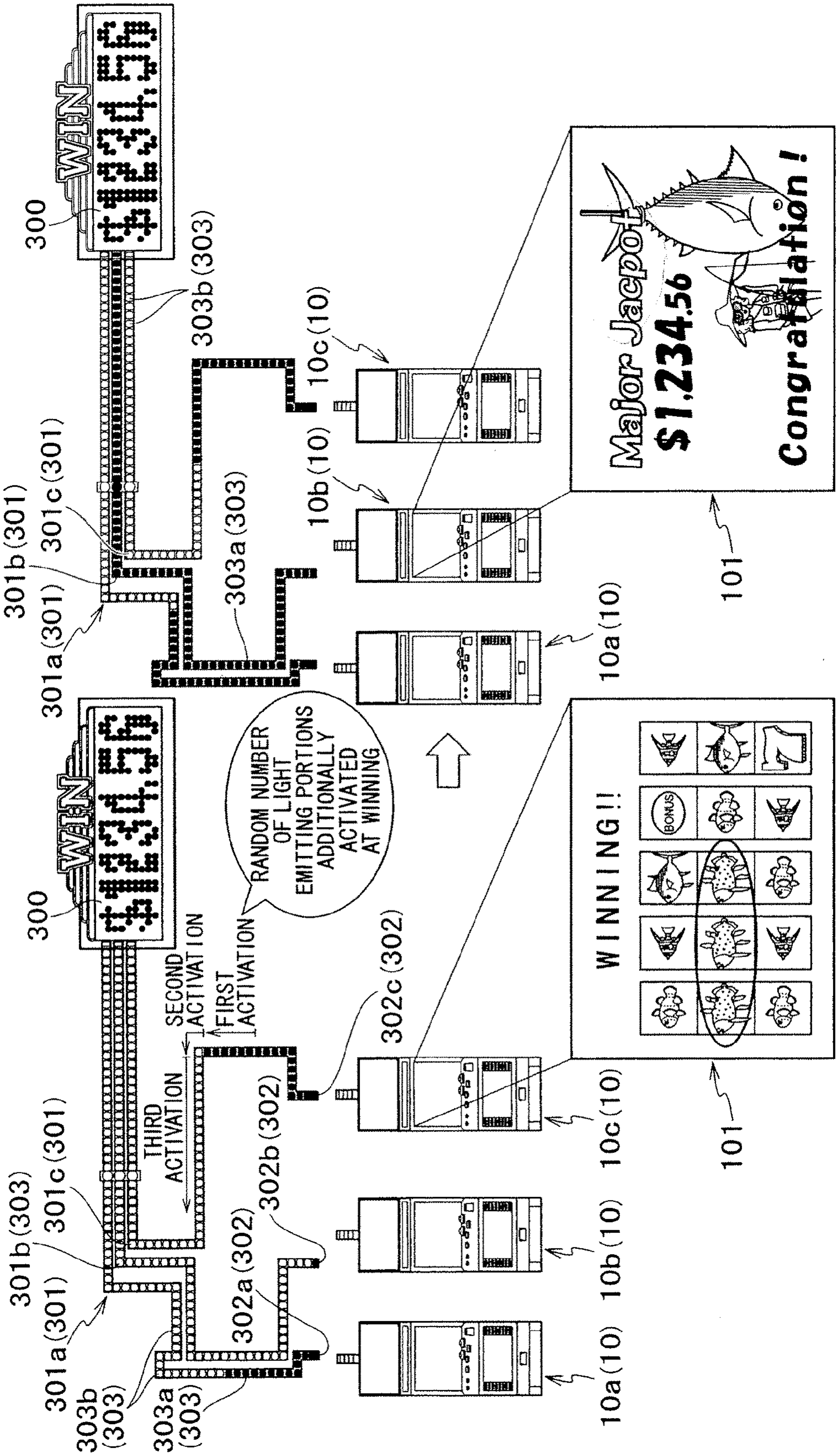
FIG. 1 is an explanatory diagram illustrating a gaming machine and a playing method thereof, according to an embodiment of the present invention.

As illustrated in FIG. 1, a gaming machine 1 performs a playing method that includes the steps of: running a base game in which a payout according to a predetermined winning is awarded, independently in each gaming terminal 10, and awarding the payout according to a predetermined winning; running a bonus game, which awards a bonus payout more rewarding than the payout in the base game, based on a predetermined condition; activating a random number of the light emitting portions 303 toward the bonus payout indicator 300 in a path 301 corresponding to a gaming terminal 10 in which a predetermined winning is met, every time the predetermined winning is met in the gaming terminals 10, such that the predetermined number of winnings required to activate the light emitting portions 303 up to the bonus payout indicator 300 is the same for all paths 301; instructing a terminal controller 100 of a gaming terminal 10, corresponding to a path 301 in which the light emitting portions 303 turned active up to the bonus payout indicator 300, to award the bonus payout; and awarding the bonus payout based on the instruction from the center controller 200.

Figure 2:
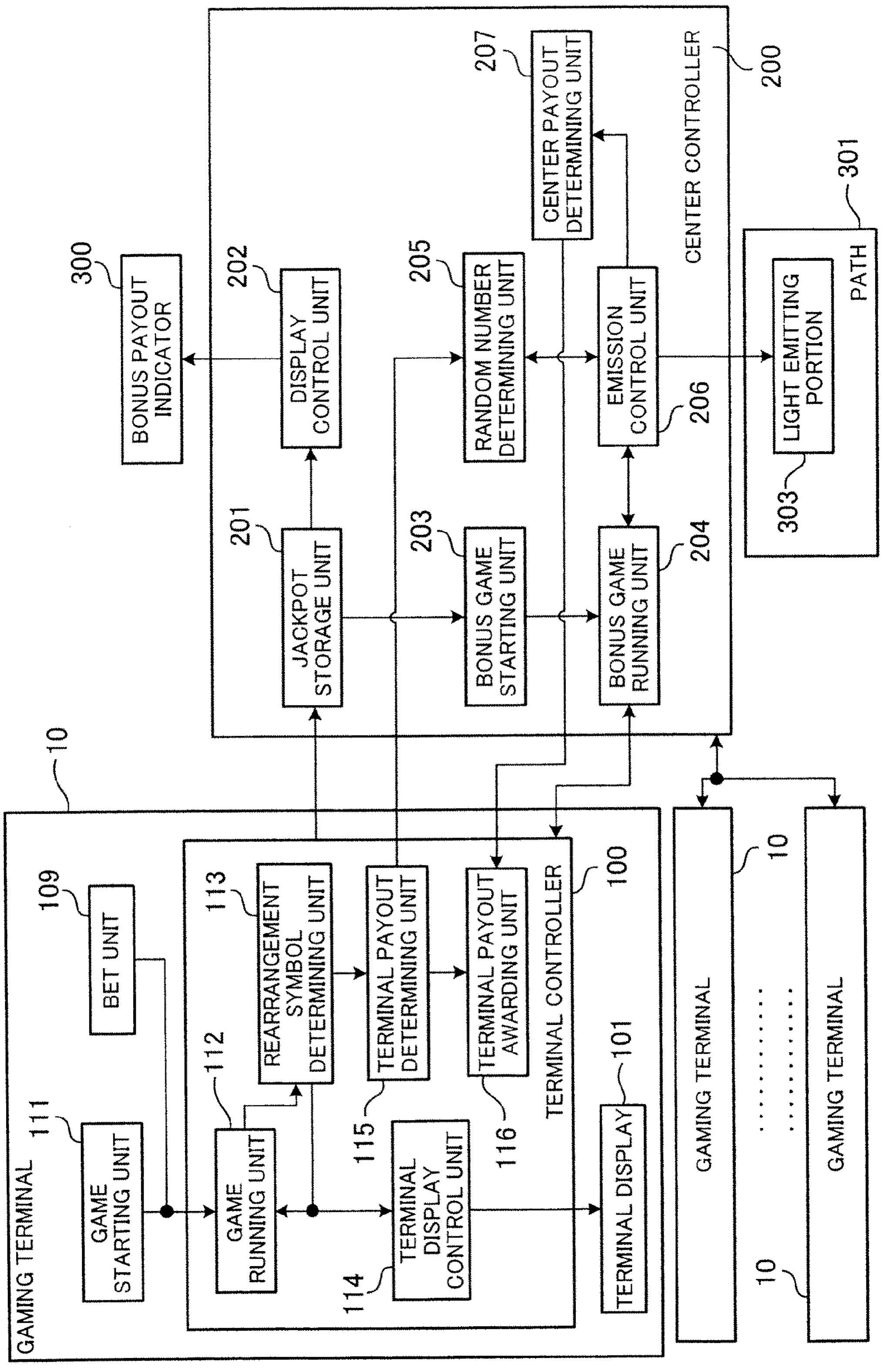
FIG. 2 is a block diagram of the gaming machine.

As illustrated in FIG. 2, the gaming machine 1 which executes the playing method has a bonus payout indicator 300, a center controller 200, gaming terminals 10, and paths 301. The paths 301 include light emitting portions 303. Each of the gaming terminals 10 includes a terminal display 101 and a terminal controller 100.

Figure 3:
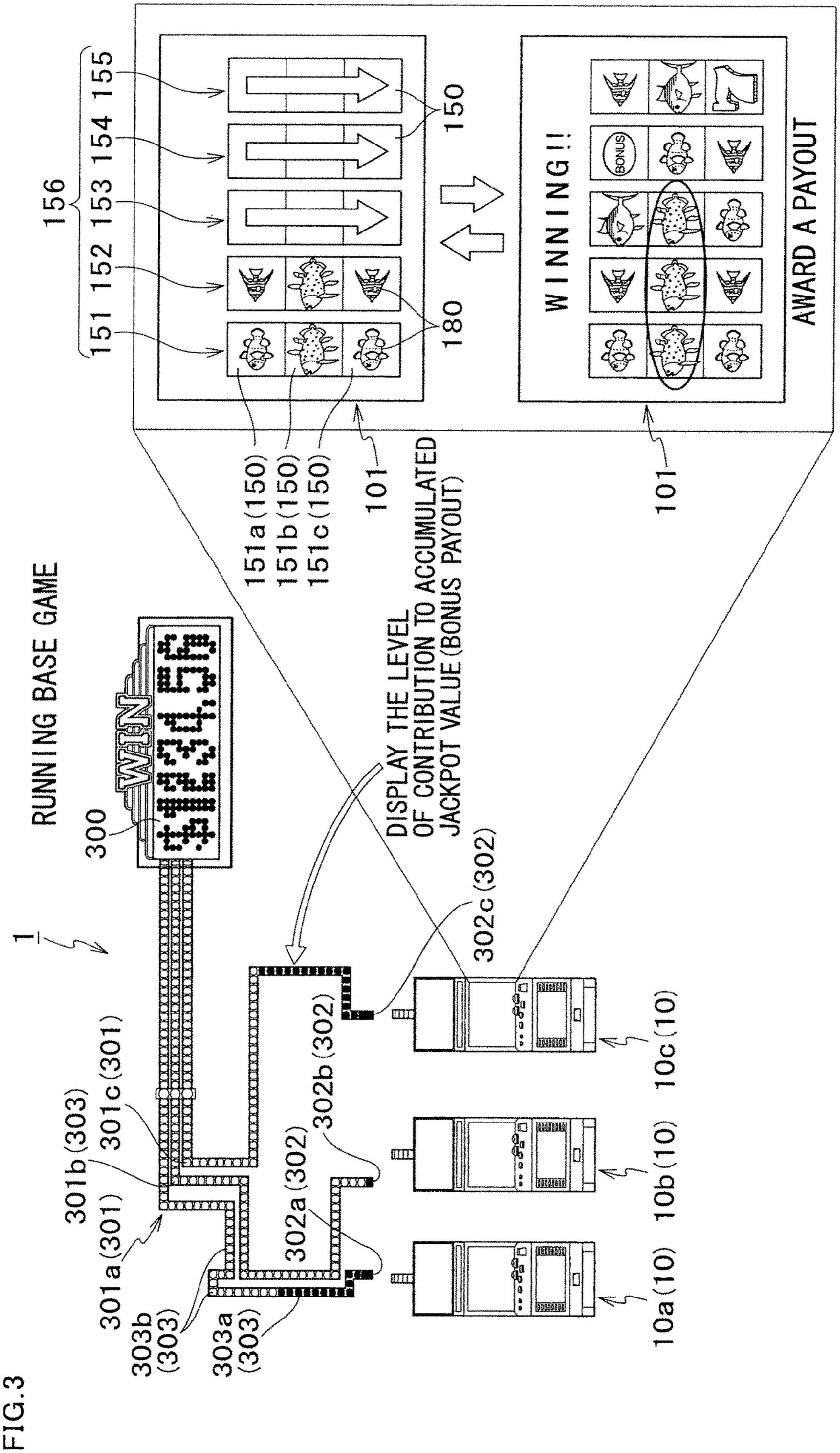
FIG. 3 is an explanatory diagram concerning a base game.

As illustrated in FIG. 3, the terminal display 101 has the arrangement areas 150, and symbols 180 are arranged in the arrangement areas 150.

The "arranging" in this specification means a state where the symbols 180 can be visually observed by a player. That is, the wording means a state where the symbols 180 are displayed in the arrangement areas 150, in FIG. 3. Arranging the symbols 180 again after dismissing the symbols 180 is referred to as "rearranging".

The terminal display 101 may have a mechanical structure adopting a reel device which rotates a reel to arrange the symbols 180. Alternatively, the terminal display 101 may have an electrical structure in which a video reel is displayed as an image and symbols 180 on a video reel are arranged in the form of an image. Further, the terminal display 101 may adopt a combination of the mechanical structure (reel) and the electrical structure (video reel). Examples of the electrical structure include a liquid crystal display device, a CRT (cathode-ray tube), a plasma display device, or the like. Further, the number of arrangement areas 150 is not limited. A specific structure of the terminal display 101 will be detailed later.

The bonus payout indicator 300 displays the amount of bonus payout awarded in a bonus game. In the example shown in FIG. 3, the bonus payout is displayed as a progressive jackpot amounting $1234.56. In this embodiment, the bonus payout indicator 300 is structured to include arrays of LEDs provided as light emitters. However, the bonus payout indicator 300 may be structured as a single liquid crystal display. The light emitters are not limited to LEDs (light-emitting diodes) so long as light is emitted.

The paths 301 are realized by arrays of light emitting portions 303 forming a channel connecting a position 302, corresponding to each gaming terminal 10, to the bonus payout indicator 300. In the example illustrated in FIG. 3, a path 301*a* forms a channel extending from a position 302*a*, corresponding to a gaming terminal 10*a*, to the bonus payout indicator 300. Similarly, a path 301*b* forms a channel having a base end at a position 302*b* corresponding to a gaming terminal 10*b*. The other end is connected to the bonus payout indicator 300. Other paths 301*c* to 301*j* are formed in the same manner. In this manner, the paths 301 are provided to correspond to the gaming terminals 10.

The light emitting portions 303 are realized by LEDs (light-emitting diodes), and are capable of emitting light in different colors. The light emitting portions 303 are lighted when activated. In FIG. 3, the light emitting portion 303 that has been activated is indicated as a light emitting portion 303*a*. The light emitting portion 303 that has not been activated is indicated as a light emitting portion 303*b*. The light emitting portions 303 are controlled to be activated one after another, from the position 302 of each gaming terminal 10 to the bonus payout indicator 300.

The light emitting portions 303 are not limited to LEDs as long as light is emitted. The activation state is not limited to a lighting state and may be a flashing state. The light emitting portions 303 may be adapted to emit only one color; however, it is preferable that the light emitting portions 303 be capable of emitting more than one color to provide a wide variety of effects.

(Terminal Controller 100)

A terminal controller 100 is configured to perform a first process and a second process. In the first process, a base game configured to award a payout according to a predetermined winning is run in each gaming terminal 10, independently from the other gaming terminals 10, and the payout according to a predetermined winning is awarded. In the second process, a bonus payout is awarded according to an instruction from the center controller 200. In other words, the terminal controller 100 has a first processing unit and a second processing unit.

The terminal controller 100 is connected to the center controller 200 and is in communication with the center controller 200.

As illustrated in FIG. 2, the terminal controller 100 is connected to a game starting unit 111. The game starting unit 111 has a function of outputting a game start signal, in response to an operation by the player. The game start signal output is then input to a later-described game running unit 112.

Further, the terminal controller 100 is connected to a BET unit 109. The BET unit 109 has functions of receiving a bet entered through an operation by the player, and outputting a BET signal in response to the bet entered. The BET signal output is input to a later-described game running unit 112.

The terminal controller 100 includes: a game running unit 112, a rearrangement symbol determining unit 113, a terminal display control unit 114, a payout determining unit 115, and a payout awarding unit 116. The game running unit 112 runs a base game, triggered by a game start signal from the game starting unit 111. In the base game, symbols 180 are rearranged in the arrangement areas 150 of the terminal display 101. Further, the terminal controller 100 outputs a progressive signal, triggered by the game start signal. The progressive signal is a signal indicating a game value.

The rearrangement symbol determining unit 113 determines, based on the state of game run by the game running unit 112, a plurality of symbols 180 to be rearranged in the arrangement areas 150.

The terminal display control unit 114 displays the symbols 180 on the terminal display 101 under control of the game running unit 112 and on the basis of a determination of the rearrangement symbol determining unit 113. A detailed display state will be detailed later.

Further, the terminal controller 100 includes a terminal payout award determining unit 115 and a terminal payout awarding unit 116. The terminal payout award determining unit 115 determines whether to award a payout, based on a relation among the symbols 180 rearranged in the arrangement areas 150 of the terminal display 101. That is, the terminal payout award determining unit 115 determines whether a predetermined winning has been met. The terminal payout awarding unit 116 awards a payout based on the determination by the terminal payout award determining unit 115. The terminal payout awarding unit 116 also awards a payout based on an instruction from the center controller 200.

Meanwhile, each block of the terminal controller 100 may be realized with hardware, or with software as needed.

(Operation of Terminal Controller 100)

The following describes an operation of the terminal controller 100 in the above structure. First, the BET unit 109 accepts a BET entered through an operation by a player. Then, in response to the operation, the game starting unit 111 outputs a game start signal to cause the game running unit 112 to start a base game. When the base game is started, the rearrangement symbol determining unit 113 determines symbols 180 to be rearranged in the arrangement areas 150. The symbols 180 to be rearranged are determined at every base game. The symbols 180 determined by the rearrangement symbol determining unit 113 undergo an image processing in the terminal display control unit 114, and are displayed on the terminal display 101. The terminal display control unit 114 rearranges the symbols 180 in the arrangement areas 150, according to the arrangement determined.

The terminal payout award determining unit 115 determines whether a predetermined winning has been met, based on the relation between the symbols 180 rearranged in the arrangement areas 150. If it is determined that a predetermined winning has been met, the terminal payout awarding unit 116 awards a payout. In this manner, the terminal controller 100 in each gaming terminal 10 executes the first process, in which a base game configured to award a payout according to a predetermined winning is run independently from the other gaming terminals 10, and in which the payout according to a predetermined winning is awarded.

Further, when a predetermined winning has been met, the terminal controller 100 transmits s winning signal, indicating that a predetermined winning has been met, to the center controller 200, based on a predetermined condition such as running of a bonus game as a shared game.

The terminal payout awarding unit 116 awards a bonus payout when instructed by the center controller 200 to award a bonus payout. In this manner, the terminal controller 100 executes the second process, in which a bonus payout is awarded based on an instruction from the center controller 200.

(Center Controller 200)

The center controller 200 is configured to perform a third process, a fourth process, and a fifth process. In the third process, a bonus game is run in which a bonus payout more rewarding than a base game payout is awarded, based on a predetermined condition. In the fourth process, a random number of the light emitting portions 303 are activated toward the bonus payout indicator 300 in a path 301 corresponding to a gaming terminal 10 in which a predetermined winning is met, every time the predetermined winning is met in the gaming terminals 10, such that the predetermined number of winnings required to activate the light emitting portions 303 up to the bonus payout indicator 300 is the same for all paths 301. In the fifth process, an instruction to award a bonus payout is sent to the terminal controller 100 of the gaming terminal 10 corresponding to the path 301 including the light emitting portions 303 that turned active up to the bonus payout indicator 300. In other words, the center controller 200 includes a third process unit, a fourth process unit, and a fifth process unit.

As illustrated in FIG. 2, the center controller 200 is connected to the terminal controller 100 and is in communication with the terminal controller 100.

The center controller 200 includes a jackpot storage unit 201, a display control unit 202, a bonus game starting unit 203, a bonus game running unit 204, a random number determining unit 205, an emission control unit 206, and a center payout determining unit 207.

The jackpot storage unit 201 stores and sums up a game value indicated by a progressive signal received from the terminal controller 100. The bonus game starting unit 203 outputs a bonus game start signal, when a predetermined condition is met. The bonus game start signal output is then input to a later-described bonus game running unit 204. For example, meeting the predetermined condition means a situation where a game value stored in the jackpot storage unit 201 sums up to a predetermined value or greater.

Triggered by a bonus game start signal received from the bonus game starting unit 203, the bonus game running unit 204 runs a bonus game, in which two or more players compete against one another for a jackpot through the gaming terminals.

The display control unit 202 causes the bonus payout indicator 300 to display the sum of jackpot values stored in the jackpot storage unit 201.

In response to a winning signal from the terminal controller 100, the random number determining unit 205 determines the number of light emitting portions 303 to be activated. The random number determining unit 205 determines the random numbers such that the predetermined number of winnings required to activate the light emitting portions 303 up to the bonus payout indicator 300 is the same for all paths 301. For example, when the predetermined number of winnings required to activate the light emitting portions 303 up to the bonus payout indicator 300 is five, the random numbers are determined such that the light emitting portions 303 turn active up to the bonus payout indicator 300 only after the winning is met five times.

The emission control unit 206 activates the light emitting portions 303 in numbers determined by the random number determining unit 205. The emission control unit 206 may activate the light emitting portions 303 such that the level of contribution of each gaming terminal 10 to the jackpot value accumulated in the jackpot storage unit 201 is displayed by the number of light emitting portions 303 that turn active.

The center payout determining unit 207 determines whether the light emitting portions 303 in each path 301 have been activated all the way up to the bonus payout indicator 300. The center payout determining unit 207, when it is determined that the light emitting portions 303 have been activated all the way up to the bonus payout indicator 300, sends an instruction to award a bonus payout, to the terminal controller 100 of the gaming terminal 10 corresponding to the path 301 in which the light emitting portions 303 turned active all the way up to the bonus payout indicator 300.

Meanwhile, each block of the center controller 200 may be realized with hardware, or with software as needed.

(Operation of Center Controller 200)

The following describes an operation of the center controller 200 in the above structure. First, the game value is accumulatively stored in the jackpot storage unit 201. A bonus game starts when the stored game value sums up to a predetermined value or greater. In this manner, based on a predetermined condition, the center controller 200 executes the third process that runs a bonus game in which a bonus payout more rewarding than a base game payout is awarded.

The center controller 200 receives a winning signal from the terminal controller 100, every time a predetermined winning is met in the gaming terminal 10. Upon receipt of the winning signal, the random number determining unit 205 randomly determines the number of light emitting portions 303 to be activated. The random number determining unit 205 determines the random numbers such that the predetermined number of winnings required to activate the light emitting portions 303 up to the bonus payout indicator 300 is the same for all paths 301. The emission control unit 206 then activates the light emitting portions 303 in numbers so determined. In this manner, the center controller 200 performs the fourth process, in which a random number of the light emitting portions 303 are activated toward the bonus payout indicator 300 in a path 301 corresponding to a gaming terminal 10 in which a predetermined winning is met, every time the predetermined winning is met in the gaming terminals 10, such that the predetermined number of winnings required to activate the light emitting portions 303 up to the bonus payout indicator 300 is the same for all paths 301.

When the light emitting portions 303 are activated all the way up to the bonus payout indicator 300, the center payout determining unit 207 sends an instruction to award a bonus payout, to the terminal controller 100 of the gaming terminal 10 corresponding to the path 301 in which the light emitting portions 303 turned active all the way up to the bonus payout indicator 300. In this manner, the center controller 200 performs the fifth process, in which an instruction to award a bonus payout is sent to the terminal controller 100 of the gaming terminal 10 corresponding to the path 301 including the light emitting portions 303 that have been activated all the way up to the bonus payout indicator 300.

As is clear from the description of the foregoing operations, the gaming machine 1 realizes a playing method including the steps of: running a base game in which a payout according to a predetermined winning is awarded, independently in each gaming terminal 10, and awarding the payout according to a predetermined winning; running a bonus game, which awards a bonus payout more rewarding than the payout in the base game, based on a predetermined condition; activating a random number of the light emitting portions 303 toward the bonus payout indicator 300 in a path 301 corresponding to a gaming terminal 10 in which a predetermined winning is met, every time the predetermined winning is met in the gaming terminals 10, such that the predetermined number of winnings required to activate the light emitting portions 303 up to the bonus payout indicator 300 is the same for all paths 301; instructing a terminal controller 100 of a gaming terminal 10, corresponding to a path 301 in which the light emitting portions 303 turned active up to the bonus payout indicator 300, to award the bonus payout; and awarding the bonus payout based on the instruction from the center controller 200.

According to this playing method, the base game is run in each gaming terminal 10, independently from the other gaming terminals 10, and the payout according to a predetermined winning is awarded. The bonus game configured to award a bonus payout more rewarding than a base game payout is run based on a predetermined condition. A random number of light emitting portions 303 are activated toward the bonus payout indicator 300 in a path 301 corresponding to the gaming terminal in which a predetermined winning has occurred, every time the predetermined winning is met in the gaming terminals 10, such that the predetermined number of winnings required to activate the light emitting portions 303 up to the bonus payout indicator 300 is the same for all paths 301. A bonus payout is awarded in the gaming terminal 10 corresponding to the path 301 including the light emitting portions 303 that have been activated all the way up to the bonus payout indicator 300. Because the light emitting portions 303 turn active toward the bonus payout indicator 300 in random numbers when a predetermined winning is met, the players cannot easily predict which path 301 contains the light emitting portions 303 that reach the bonus payout indicator 300 first by activation. That is, a new kind of entertainment is provided. Further, because the light emitting portions 303 turn active in random numbers such that the predetermined number of winnings required to activate the light emitting portions 303 up to the bonus payout indicator 300 is the same for all paths 301, the difficulty of activating the light emitting portions 303 to the bonus payout indicator 300 (winning percentage of a bonus game) is perceived as being different in each path 301, while it is actually the same for all paths 301. That is, a new kind of entertainment is provided.

(Running Base Game)

The following specifically describes an example of a base game in the gaming machine 1 and the playing method. Note that the following example deals with a case where the terminal display 101 adopts a video reel and arranges symbols on a video reel, as illustrated in FIG. 3.

As illustrated in FIG. 3, a matrix 156 is in the center of the terminal display 101. The matrix 156 includes symbols 180, which are scroll displayed. The display windows 151 to 155 are respectively divided into upper stages 151*a* to 155*a*, central stages 151*b* to 155*b*, and lower stages 151*c* to 155*c*. The symbols 180 are stopped (arranged) in the stages 151*a* to 155*a*, 151*b* to 155*b*, and 151*c* to 155*c*, respectively. The matrix 156 is a symbol matrix including five columns/three rows. The matrix 156 however is not limited to the one with the five-columns/three-rows.

As illustrated in FIG. 3, the terminal display 101 variably displays symbols 180 when a base game is started in the gaming terminal 10. When this variable-displaying of symbols 180 stops, symbols 180 are rearranged in the arrangement areas 150. Then, when a winning is met according to a relation among the rearranged symbols 180, a payout according to this winning is awarded.

Note that, part of the bet made by the player is accumulated in the form of a jackpot value, every time a base game is started. The jackpot value so accumulated is displayed in the bonus payout indicator 300, as illustrated in FIG. 3. Further, as shown in FIG. 3, the light emitting portions 303 may be activated for each path 301, according to the amount of bet accumulated as a jackpot value.

(Running Bonus Game)

The following specifically describes an example of a bonus game in the gaming machine 1 and the playing method.

A bonus game is started when the accumulated jackpot value exceeds a certain value. In a bonus game, the symbols 180 are rearranged in the matrix 156 in each gaming terminal 10. When a predetermined winning is met by the rearrangement of the symbols 180, the light emitting portions 303 turn active in random numbers, in the path 301 corresponding to the gaming terminal 10 in which the winning has occurred. This operation is repeated until the light emitting portions 303 in any of the paths 301 are activated up to the bonus payout indicator 300.

Figure 4:
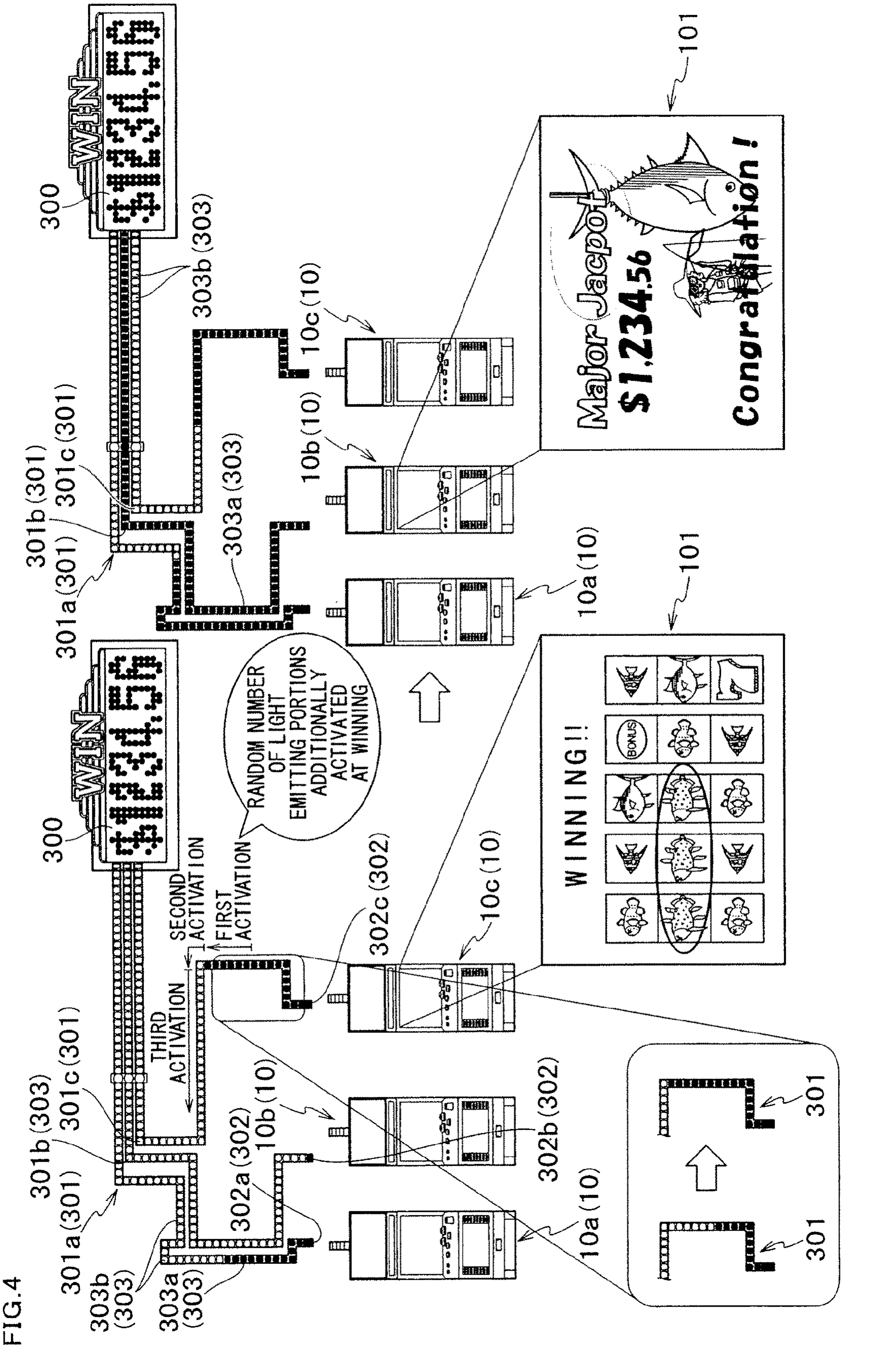
FIG. 4 is an explanatory diagram concerning a bonus game.

For example, when a predetermined winning is met in a gaming terminal 10*c* (10), six additional light emitting portions 303 turn active, as illustrated in FIG. 4. When another predetermined winning is met in the same gaming terminal 10*c* (10), one additional light emitting portion 303 turns active. Further, when another predetermined winning is met in the same gaming terminal 10*c* (10), eighteen additional light emitting portions 303 turn active. In this manner, every time a winning is met, a random number of the light emitting portions 303 are activated toward the bonus payout indicator 300.

The random number is one or more because it is preferable that the light emitting portion 303 always turn active when a winning is met. Considering the intent of the present invention, a random number of zero is not preferable because in this case the light emitting portions 303 will not turn active even when a winning is met.

The random number of the light emitting portions 303 that turn active is determined such that the predetermined number of winnings required to activate the light emitting portions 303 up to the bonus payout indicator 300 is the same for all paths 301. In one embodiment of the present invention, the predetermined number of winnings required to activate the light emitting portions 303 up to the bonus payout indicator 300 is five. The random number is determined every time a winning is met, such that the light emitting portions 303 turn active up to the bonus payout indicator 300 when the winning is met five times. The random number is one or more, and no greater than the value obtained by subtracting the remaining number of winnings from the number of light emitting portions 303 yet to be activated. The number of light emitting portions 303 yet to be activated is the number of light emitting portions 303 that have not been activated in the path 301 to which they belong. The remaining number of winnings is the value obtained by subtracting the number of winnings met from the required number of winnings. The random numbers are determined based on a path table and a path activation state table, as will be described later. The method of determining the random numbers is not limited to the one described in this embodiment.

When the light emitting portions 303 are activated all the way up to the bonus payout indicator 300, a jackpot is awarded as a bonus payout in the gaming terminal 10 corresponding to the path 301 in which the light emitting portions 303 turned active up to the bonus payout indicator 300. In the example shown in FIG. 4, the light emitting portions 303 in the path 301*b* (301) have been activated up to the bonus payout indicator 300. As such, a jackpot is awarded in the gaming terminal 10*b* (10) corresponding to the path 301*b* (301).

(Arrangement of Light Emitting Portions 303 and Order of Activation of Light Emitting Portions 303)

Figure 5A:
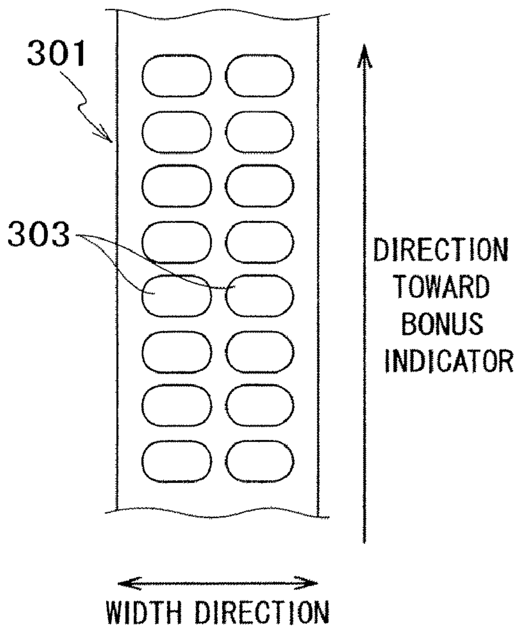
FIG. 5 is an explanatory diagram illustrating an alternative form concerning an arrangement of light emitting portions, and an alternative form of the activation pattern of light emitting portions.
Figure 5B:
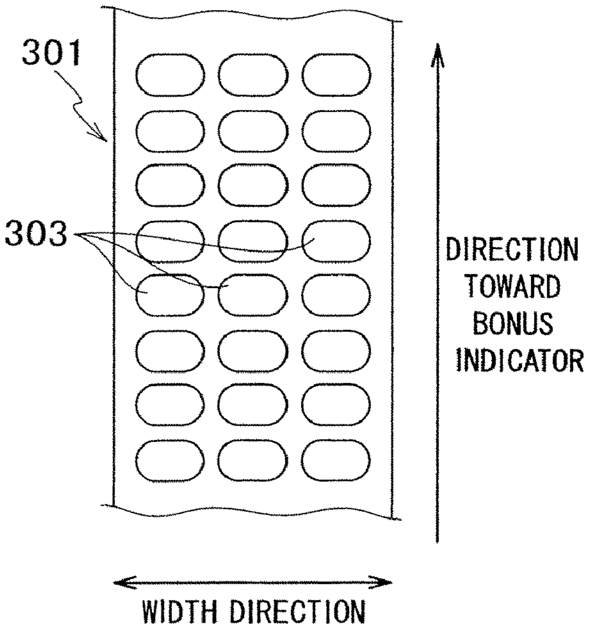

In one embodiment of the present invention, the light emitting portions 303 are arranged in the path 301 so that one light emitting portion 303 is disposed along the width direction of the path 301. However, as shown in FIG. 5A, two light emitting portions 303 may be disposed along the width direction of the path 301. Further, three light emitting portions 303 may be disposed along the width direction of the path 301, as shown in FIG. 5B. In other words, more than one light emitting portion 303 may be disposed along the width direction of the path 301. According to this arrangement, the light emitting portions 303 can be disposed in the path 301 in sufficient numbers to enable a wide variety of activation patterns for the light emitting portions 303. That is, a new kind of entertainment is provided.

Figure 5C:
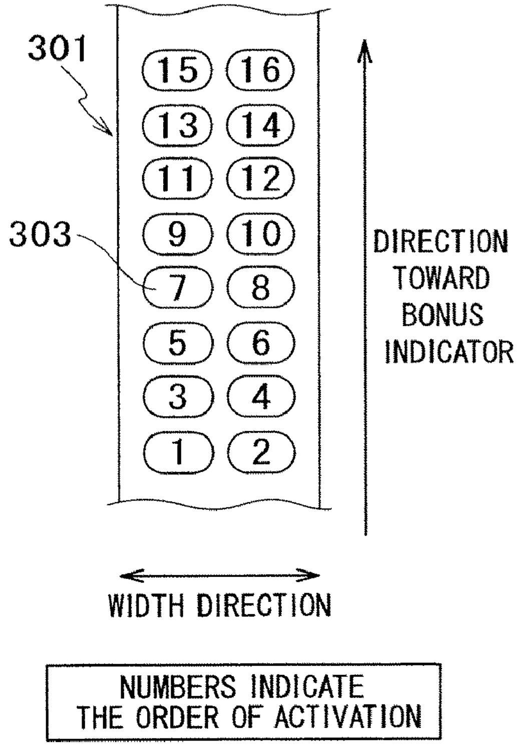
Figure 5D:
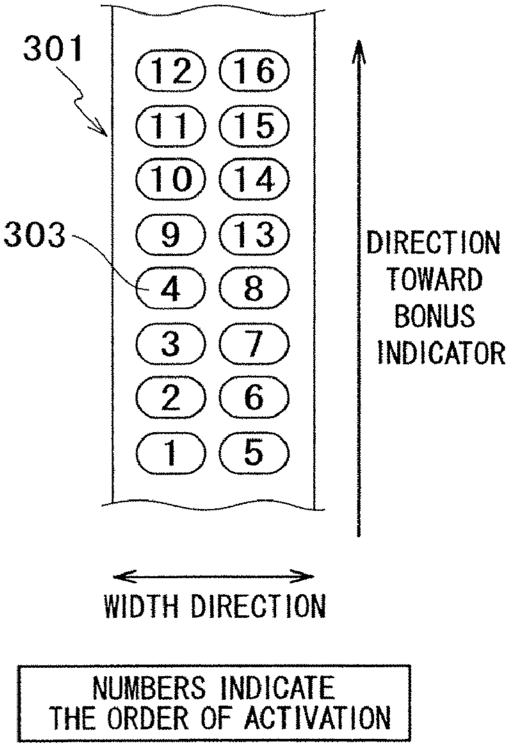

Further, by disposing more than one light emitting portion 303 along the width direction of the path 301, the light emitting portions 303 can be activated in many different orders. For example, as shown in FIG. 5C, the light emitting portions 303 may be activated toward the bonus payout indicator 300 after all the light emitting portions 303 disposed along the width direction of the path 301 have been activated. Further, as shown in FIG. 5D, the light emitting portions 303 may be activated by first activating predetermined numbers of light emitting portions 303 toward the bonus payout indicator 300, and then activating the light emitting portions 303 disposed side by side with these light emitting portions 303 along the width direction, before activating another set of light emitting portions 303 toward the bonus payout indicator 300. In this manner, the light emitting portions 303 can be activated in a wide variety of patterns. That is, a new kind of entertainment is provided.

[Symbol, Combination, or the Like]

The terminal display 101 has the matrix 156 including symbol columns each having twenty two symbols 180 as illustrated in FIG. 8. To each of the symbols constituting the columns is given one of code numbers 0 to 21. Each symbol column is made from a combination of "Angelfish", "Clownfish", "7", "Tuna", "Coelacanth", and "Bonus".

Of the symbols in the symbol columns, the display windows 151 to 155 each displays (arranges) three successive symbols. The symbols arranged in the upper stages 151*a* to 155*a*, the central stages 151*b* to 155*b*, and the lower stages 151*c* to 155*c* form a symbol matrix having five columns and three rows. When a BET button and a start button are sequentially pressed in this order to start a game, symbols constituting the symbol matrix start to scroll. This scrolling of the symbols stops (rearrangement) after a predetermined period from the beginning of the scrolling.

Further, for each symbol, a predetermined scatter symbol is determined in advance. Scatter symbols are such symbols that a player is put in an advantageous position when a predetermined number or more of them are displayed in the matrix 156. For example, the advantages includes: a state where coins corresponding to the scatter symbols are paid out, a state where the number of coins to be paid out is added to a credit, a state where a bonus game is started.

Here, a bonus game is a gaming state which provides a larger advantage than a base game. In this embodiment, the bonus game is a jackpot game. No particular limitation is put on the bonus game, as long as it is a gaming state advantageous to the player, that is, it is more advantageous than the base game. For example, the bonus game may include a state where more game media are obtainable than in the base game, a state where a game medium is obtainable with higher probability than in the base game, a state where a game medium is less consumed than in the base game, and the like. Specifically, a free game, a second game, a feature game, and the like may be mentioned as examples of the bonus game.

[Mechanical Structure of Gaming Machine 1]

Next, the following describes a specific example of mechanical and electrical structures of the gaming machine 1 thus structured.

A gaming machine 1 is placed in a gaming facility such as a casino. This gaming machine 1 runs a unit game which involves a game medium. The game medium is a coin, bill, or a value in the form of electronic information. However, the game medium in the present invention is not particularly limited. For example, a medal, token, electronic money, ticket or the like are also possible. Further, the ticket is not particularly limited and may be a later-described ticket with a barcode or the like ticket.

Figure 6:
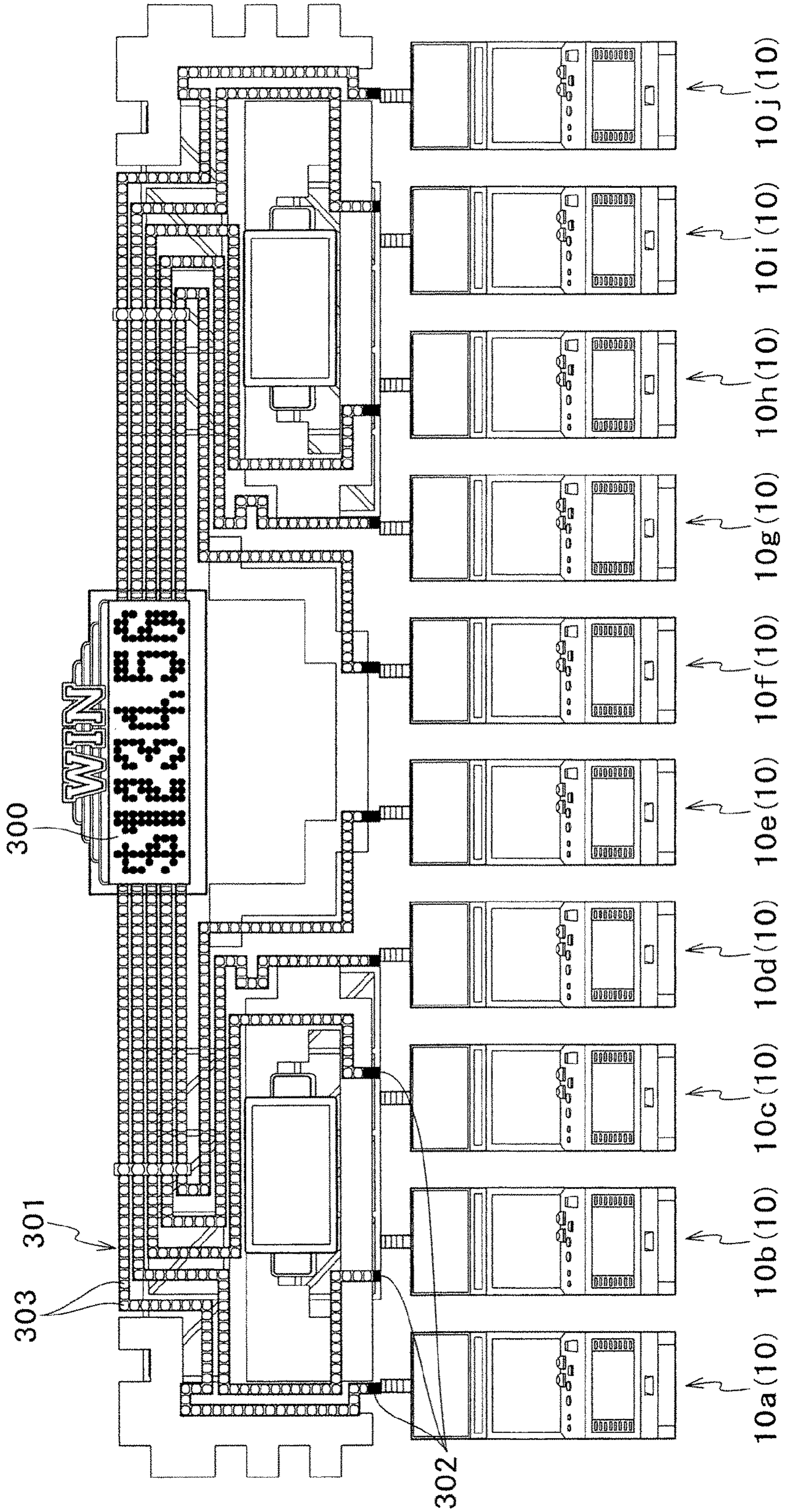
FIG. 6 is a front view illustrating an external appearance of the gaming machine.

As illustrated in FIG. 6, the gaming machine 1 includes: a gaming terminal 10 that independently runs a base game; a center controller 200, connected to and in communication with the gaming terminal 10, that runs a bonus game; a bonus payout indicator 300 that displays the amount of a bonus payout awarded in a bonus game; and paths 301 each including the light emitting portions 303 arranged to form a channel extending from the position 302 corresponding to each gaming terminal 10 to the bonus payout indicator 300.

Figure 7:
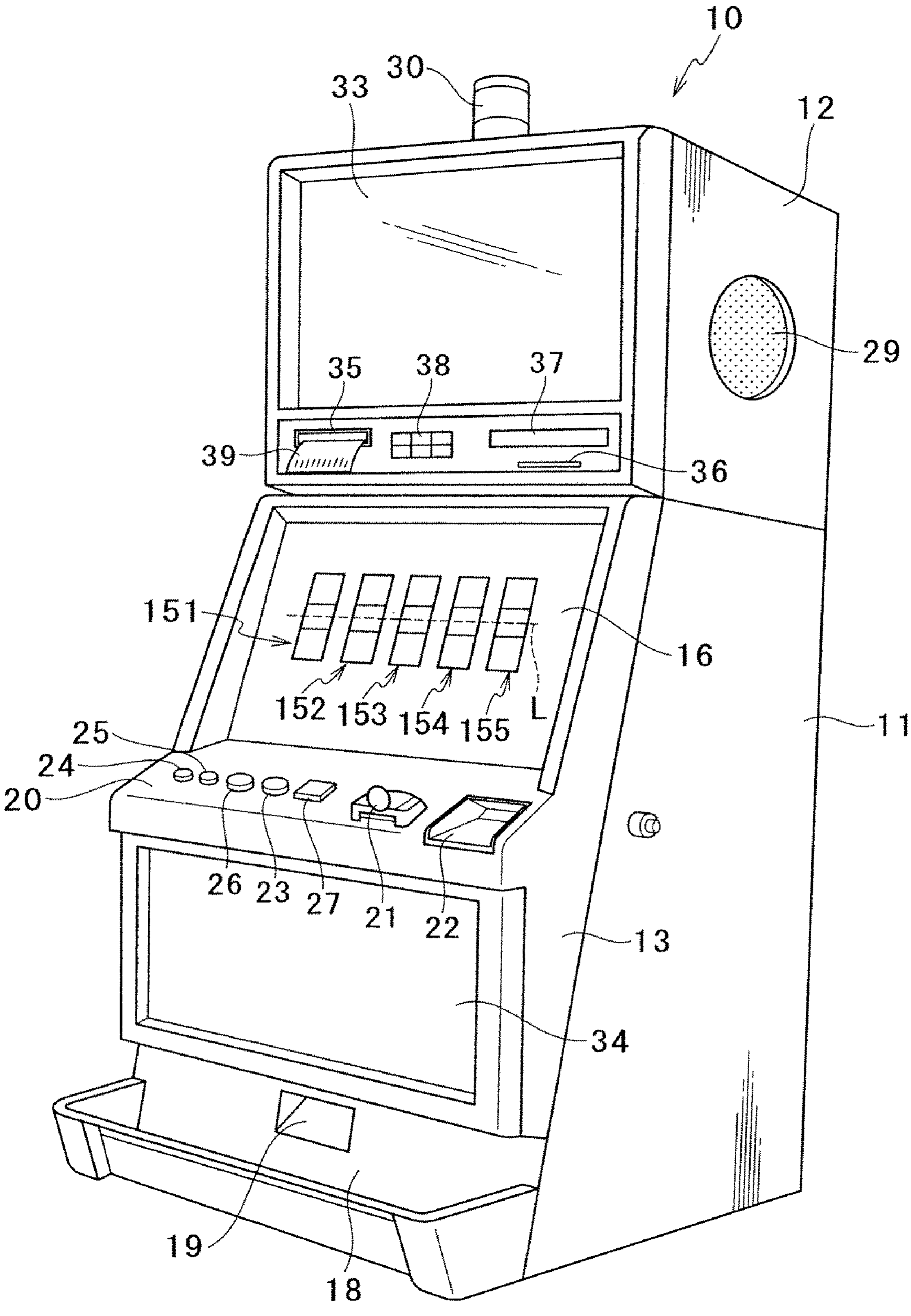
FIG. 7 is a perspective view illustrating an external appearance of the gaming terminal.

As illustrated in FIG. 7, the gaming terminal 10 includes: a cabinet 11, a top box 12 provided above the cabinet 11, and a main door 13 provided on the front surface of the cabinet 11. The main door 13 has a lower image display panel 16. The lower image display panel 16 has a transparent liquid crystal panel for displaying various information. The lower image display panel 16 displays display windows 151 to 155 (matrix 156) for arranging therein symbols 180. Further, the lower image display panel 16 displays as needed various information and effect images related to a game.

The present embodiment deals with a case where the lower image display panel 16 electrically displays symbols 180 arranged in five rows/three columns. However, the present invention is not limited to this.

The lower image display panel 16 displays a single activated payline L. Note that the number of pay lines L may be two or more. When the number of pay lines L is two or more, the number of pay lines L activated may be determined according to a predetermined condition, such as the number of coins placed as a BET.

Note that the lower image display panel 16 may have a credit value indicator and a payout value indicator. The credit value indicator displays a total value (hereinafter also referred to as total credit value) which a gaming terminal 10 can pay out to a player. When symbols stopped along a pay line L form a winning combination, the payout value indicator displays the number of coins to be paid out.

Further, scatter symbols may be adopted, and the number of coins to be paid out may be determined, according to the number of scatter symbols displayed on the matrix 156. Note that the pay line L does not necessarily have to be displayed.

Below the lower image display panel 16 provided are a control panel 20, a coin insertion slot 21, and a bill validator 22. The control panel 20 is provided with various buttons 23 to 27. These buttons 23 to 27 allow a player to input instructions related to a game played by the player. Through the coin insertion slot 21, a coin is received in the cabinet 11.

The control panel 20 includes: a spin button 23, a change button 24, a cashout button 25, a 1-BET button 26, and a maximum BET button 27. The spin button 23 is for inputting an instruction to start symbol scrolling. The change button 24 is used to ask a staff person in the gaming facility for exchange of money. The cashout button 25 is for inputting an instruction to pay out coins corresponding to the total credit-value into the coin tray 18.

The 1-BET button 26 is used for betting one coin out of those corresponding to the total credit value. The maximum BET button 27 is used for betting, out of those corresponding to the total credit value, a maximum number of coins (e.g., fifty coins) which can be bet in one game.

The bill validator 22 validates whether bill is genuine or not and receives the genuine bill into the cabinet 11. Note that the bill validator 22 is capable of reading a barcode attached to a later-mentioned ticket 39 having a barcode (hereinafter simply referred to as ticket 39). When the bill validator 22 reads the ticket 39, it outputs to the main CPU 41 a read signal representing information having read from the barcode.

On the lower front surface of the main door 13, that is, below the control panel 20, a belly glass 34 is provided. On the belly glass 34, a character of a gaming terminal 10 or the like is drawn. On the front surface of top box 12 is provided an upper image display panel 33. The upper image display panel 33 has a liquid crystal panel and displays an effect image, introduction to the game, rules of the game, or the like.

Further, the top box 12 has a speaker 29 for performing an audio output. Below the upper image display panel 33 are provided a ticket printer 35, a card reader 36, a data displayer 37, and a keypad 38. The ticket printer 35 prints, onto a ticket, a barcode having encoded data containing credit-value, date and time, identification number of a gaming terminal 10 or the like, thereby issuing a ticket 39 having a barcode attached thereto. A player can play a game in another gaming terminal 10 with the ticket 39 having the barcode, or exchange the ticket 39 having the barcode with bill or the like at a change booth or the like of the game arcade.

The card reader 36 reads/writes data from/into a smart card. The smart card is carried by a player, and stores therein data for identifying the player, data relating to a history of games played by the player, or the like.

The data displayer 37 includes a fluorescent display or the like, and displays the data read by the card reader 36 and the data input by the player through the keypad 38. The keypad 38 is for entering instructions or data relating to issuing of a ticket or the like.

[Electrical Structure of Gaming Machine 1]

Figure 11:
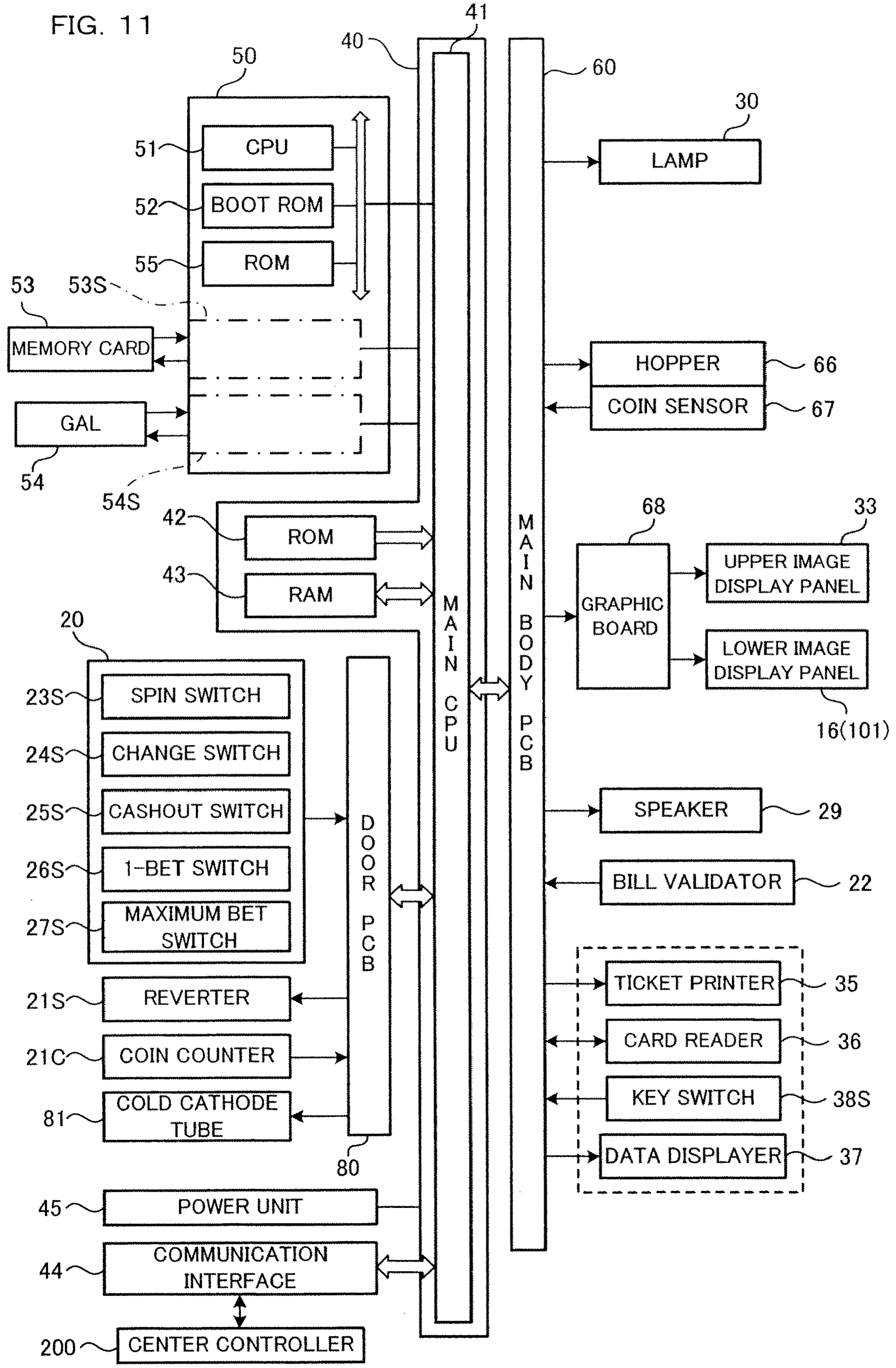
FIG. 11 is a block diagram illustrating an electrical structure of the gaming terminal.
Figure 12:
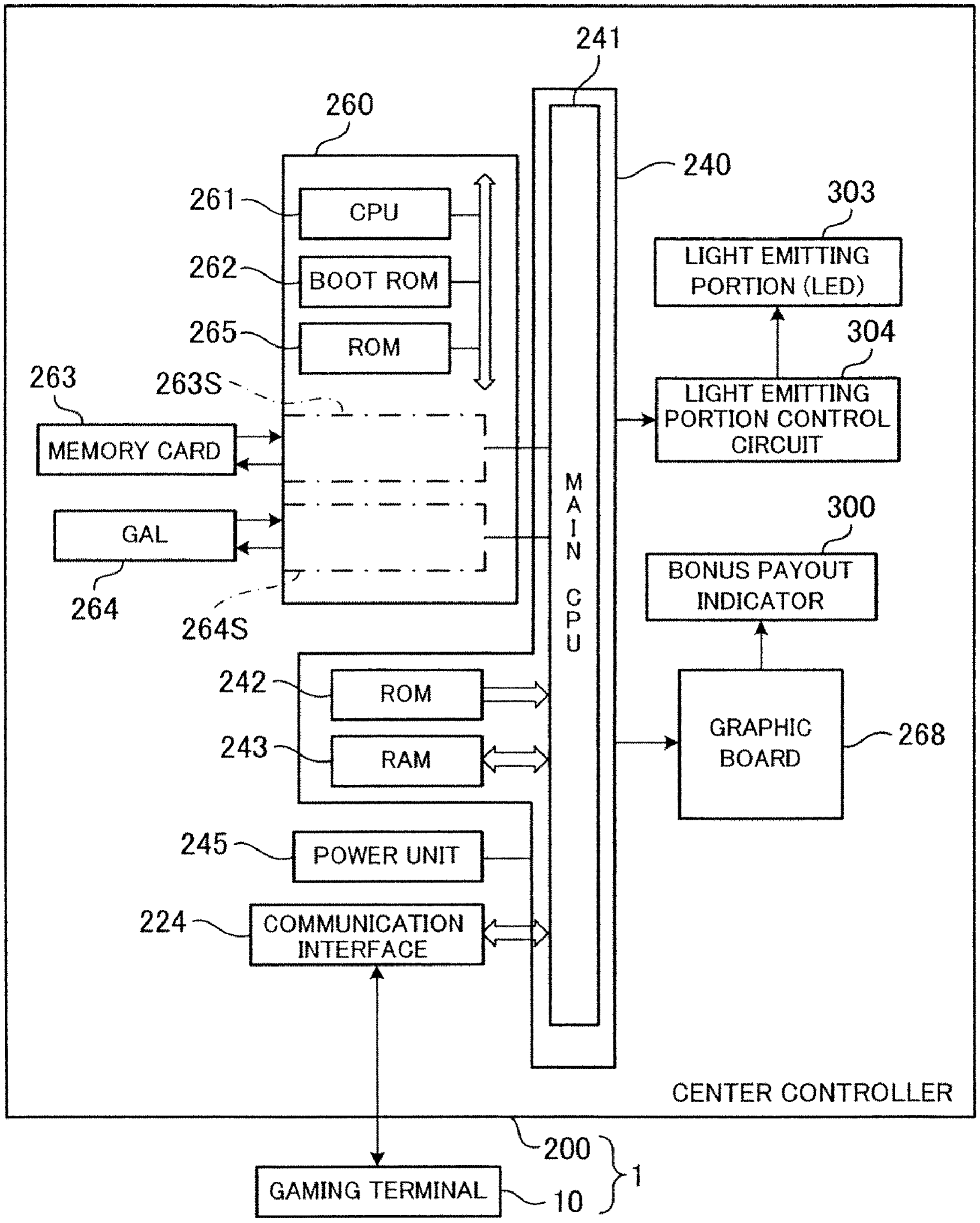
FIG. 12 is a block diagram illustrating an electrical structure of a center controller.

FIGS. 11 and 12 are block diagrams each illustrating an electrical structure of the entire gaming machine 1.

(Electrical Structure of Gaming Terminal 10)

FIG. 11 is a block diagram showing an electrical structure of the gaming terminal 10. As illustrated in FIG. 11, the cabinet 11 includes a control unit having a terminal controller 100. As illustrated in FIG. 11, the control unit includes a motherboard 40, a main body PCB (Printed Circuit Board) 60, a gaming board 50, a door PCB 80, various switches, sensors, or the like.

The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein a game program and a game system program. The game program contains a stop symbol determining program. The stop symbol determining program determines symbols (code number corresponding to the symbol) to be stopped in the arrangement areas 150. This stop symbol determining program contains sets of symbol weighting data respectively corresponding to various payout rates (e.g., 80%, 84%, 88%). Each set of the symbol weighting data indicates, for each of the display windows 151 to 155, a code number of each symbol and at least one random numerical value allotted to the code number. The numerical value is a value within a predetermined range of 0 to 256 for example.

The payout rate is determined based on payout rate setting data output from the GAL 54. Based on a set of the symbol weighting data corresponding to the payout rate determined, a symbol to be stopped is determined.

The memory card 53 stores therein various types of data for use in the game programs and the game system programs. For example, the memory card 53 stores a table listing combinations of a symbol 180 to be displayed on the display windows 151 to 155 of FIG. 1 and an associated range of random numerical values. This data is transferred to the RAM 43 of the motherboard 40, at the time of running a game programs.

The card slot 53S is structured so as to allow the memory card 53 to be attached/detached to/from the card slot 53S. This card slot 53S is connected to the motherboard 40 through an IDE bus. Thus, the type and content of a game run by a gaming terminal 10 can be modified by detaching the memory card 53 from the card slot 53S, writing a different game program and a different game system program into the memory card 53, and inserting the memory card 53 back into the card slot 53S.

Each of the game programs includes a program related to the progress of the game and/or a program for causing a transition to a bonus game. Each of the game programs includes image data and audio data output during the game.

The GAL 54 has input and output ports. When the GAL 54 receives data via the input port, it outputs data corresponding to the input data from its output port. This data from the output port is the payout rate setting data described above.

IC socket 54S is structured so as to allow the GAL 54 to be attached/detached to/from the IC socket 54S. The IC socket 54S is connected to the motherboard 40, via a PCI bus. Thus, the payout rate setting data to be output from GAL 54 can be modified by: detaching the GAL 54 from the IC socket 54S, overwriting the program stored in the GAL 54, and attaching the GAL 54 back to the IC socket 54S.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50. The ROM 55 stores country identification information and an authentication program. The boot ROM 52 stores a preliminary authentication program and a program (boot code) for enabling the CPU 51 to run the preliminary authentication program.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (terminal controller 100), a ROM (Read Only Memory) 42, a RAM (Random Access Memory) 43, and a communication interface 44.

The main CPU 41 serves as a terminal controller 100 and has a function of controlling the entire gaming terminal 10. In particular, the main CPU 41 controls the following operations: an operation of outputting a signal instructing variable-displaying of symbols 180 to the graphic board 68, which is performed in response to pressing of the spin button 23 after betting of credit; an operation of determining symbols 180 to be stopped after the variable-displaying of symbols 180; and an operation of stopping the symbols 180 thus determined in the display window 151 to 155.

In other words, the main CPU 41 serves as an arrangement controller which arranges symbols to form a new symbol matrix through scrolling of symbols displayed on the lower image display panel 16. This main CPU 41 therefore determines symbols to be arranged in a symbol matrix by selecting symbols to be arranged from various kinds of symbols. Then, the main CPU 41 executes arrangement control to stop scrolling the symbols to present the symbols thus determined.

The ROM 42 stores a program such as BIOS (Basic Input/Output System) run by the main CPU 41, and permanently-used data. When the BIOS is run by the main CPU 41, each of peripheral devices is initialized and the game program and the game system program stored in the memory card 53 are read out through the gaming board 50. The RAM 43 stores data or a program used for the main CPU 41 to perform a process.

The communication interface 44 is provided to communicate with a host computer and the like equipped in the gaming facility, through the network (communication line). The communication interface 44 is also for communicating with the center controller 200 through a communication line. Further, a main body PCB (Printed Circuit Board) 60 and a door PCB 80 are connected to the motherboard 40, through USB (Universal Serial Bus). Further, the motherboard 40 is connected to a power unit 45. The power unit 45 supplies power to the motherboard 40 to boot the main CPU 41 thereof. Meanwhile, the power unit 45 supplies power to the gaming board 50 through the PCI bus to boot the CPU 51 thereof.

The main body PCB 60 and door PCB 80 are connected to various devices or units which generate signals to be input to the main CPU 41, and various devices or units whose operations are controlled by signals from the main CPU 41. Based on a signal input to the main CPU 41, the main CPU 41 runs the game program and the game system program stored in the RAM 43, to perform an arithmetic process. Then, the main CPU 41 stores the result of the arithmetic process in the RAM 43, or transmits a control signal to the various devices and units to control them based on the result.

The main body PCB 60 is connected with a lamp 30, a hopper 66, a coin sensor 67, a graphic board 68, the speaker 29, a bill validator 22, a ticket printer 35, a card reader 36, a key switch 38S, and a data displayer 37.

The lamp 30 is turned on/off on the basis of a control signal from the main CPU 41.

The hopper 66 is mounted in the cabinet 11 and pays out a predetermined number of coins from a coin outlet 19 to the coin tray 18, based on a control signal from the main CPU 41. The coin sensor 67 is provided inside the coin outlet 19, and outputs a signal to be input to the main CPU 41 upon sensing that a predetermined number of coins have been delivered from the coin outlet 19.

The graphic board 68 controls image displaying of upper image display panel 33 and the lower image display panel 16, based on a control signal from the main CPU 41. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 reads an image on the bill and takes only those recognized as to be genuine into the cabinet 11. When taking in a genuine bill, the bill validator 22 outputs an input signal indicating the value of the bill to the main CPU 41. The main CPU 41 stores into the RAM 43 a credit-value corresponding to the value of the bill indicated by the signal.

The ticket printer 35 prints a barcode onto a ticket to issue a ticket 39 having the barcode. The barcode contains encoded data such as credit-value stored in the RAM 43, date and time, identification number of the gaming terminal 10, or the like, based on a control signal from the main CPU 41.

The card reader 36 reads out data from the smart card and transmits the data to the main CPU 41. Further, the card reader 36 writes data into the smart card based on the control signal output from the main CPU 41. The key switch 38S is mounted to the keypad 38, and outputs a signal to the main CPU 41 in response to an operation of the keypad 38 by the player. The data displayer 37 displays, based on a control signal from the main CPU 41, the data read by the card reader 36 or the data input by the player through the keypad 38.

The door PCB 80 is connected to a control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-BET switch 26S associated with the 1-BET button 26; and a maximum BET switch 27S associated with the maximum BET button 27. Each of the switches 23S to 27S outputs a signal to the main CPU 41, when a player presses the associated button.

The coin counter 21C is provided within the coin insertion slot 21, and identifies whether the coin inserted into the coin insertion slot 12 by the player is genuine. A coin except the genuine coin is discharged from the coin outlet 19. In addition, the coin counter 21C outputs an input signal to the main CPU 41 upon detection of a genuine coin.

The reverter 21S is operated on the basis of the control signal output from the main CPU 41 and distributes a coin, which is recognized as a genuine coin by the coin counter 21C, to a not-shown cash box or hopper 66 mounted in the gaming terminal 10. In other words, when the hopper 66 is full of the coins, the genuine coin is distributed into the cash box by the reverter 21S. On the other hand, when the hopper 66 is not yet full with the coins, the genuine coin is distributed into the hopper 66. The cold cathode tube 81 functions as a backlight mounted to rear sides of the lower image display panel 16 and the upper image display panel 33. This cold cathode tube 81 turns on according to a control signal from the main CPU 41.

(Electrical Structure of Center Controller 200)

FIG. 12 is a block diagram illustrating an electrical structure of the center controller 200. The center controller 200 is provided therein with a control unit. As illustrated in FIG. 11, the control unit includes a motherboard 240, a gaming board 260, an actuator, or the like.

The gaming board 260 has the same structure as that of the gaming board 50. The motherboard 240 has the same structure as that of the motherboard 40. The communication interface 244 communicates with the terminal controller 100 through a communication line.

The graphic board 268 has the same structure as that of the graphic board 68, except that the graphic board 268 controls displaying of the bonus payout indicator 300 based on a control signal from the main CPU 241.

A light emitting portion control circuit 304 controls the operation of the LEDs provided as the light emitting portions 303, and activates and inactivates the light emitting portions 303 based on the control signal output from the main CPU 241.

(Path Table)

FIG. 9 is a diagram showing a path table. The path table is stored in a ROM 242, and indicates the number of light emitting portions 303 arranged in each path 301. For example, the path table indicates that the paths 301*a*, 301*b*, 301*c*, and 301*j* include 100, 110, 120, and 100 light emitting portions 303, respectively.

(Path Activation State Table)

FIG. 10 is a diagram showing a path activation state table. The path activation state table is stored in a RAM 243. The path activation state table indicates, for each path 301, the number of activated light emitting portions 303, the number of light emitting portions 303 yet to be activated, the number of winnings met, and the remaining number of potential winnings. For example, the path activation state table indicates that, in the path 301*a*, the number of activated light emitting portions 303 is ten, ninety light emitting portions 303 are to be activated, one winning has been met, and there are four potential winnings.

In the path activation state table shown in FIG. 10, the following random numbers are determined when a winning is met in each path 301: 1 to 87 for the path 301*a*, 1 to 106 for the path 301*b*, 1 to 20 for the path 301*c*, and 1 to 67 for the path 301*j*, all inclusive.

[Operation of Gaming Machine 1: Boot Process]

The following describes a boot process routine which takes place in the gaming machine 1. Upon powering on the gaming machine 1, a boot process routine shown in FIG. 13 starts in: the motherboard 240 and gaming board 260 in the center controller 200, and in the motherboard 40 and the gaming board 50 in the terminal controller 100. The memory cards 53 and 263 are assumed to be inserted into the card slots 53S and 263S of the gaming boards 50 and 260, respectively. Further, the GALs 54 and 264 are assumed to be attached to the IC sockets 54S and 264S, respectively.

First, turning on the power switch of (powering on) the power units 45 and 245 boots the motherboards 40 and 240, and the gaming boards 50 and 260. Booting the motherboards 40 and 240 and the gaming boards 50 and 260 starts separate processes in parallel. Specifically, the CPUs 51 and 261 read out preliminary authentication programs stored in the boot ROMs 52 and 262, respectively. Then, preliminary authentication is performed according to the read out programs so as to confirm and authenticate that no modification is made to authentication programs, before reading them in the motherboards 40 and 240, respectively (S1). Meanwhile, the main CPUs 41 and 241 of the motherboards 40 and 240 run BIOS stored in the ROMs 42 and 242 to load into the RAMs 43 and 243 compressed data built in the BIOS, respectively (S2). Then, the main CPUs 41 and 241 run a procedure of the BIOS according to the data loaded into the RAMs 43 and 243 so as to diagnose and initialize various peripheral devices (S3).

The main CPUs 41 and 241, which are respectively connected to the ROMs 55 and 265 of the gaming boards 50 and 260 via PCI buses, read out authentication programs stored in the ROMs 55 and 265 and stores them in the RAMs 43 and 243 (S4). During this step, the main CPUs 41 and 241 each derives a checksum through ADDSUM method (a standard check function) which is adopted in a standard BIOS, and store the authentication programs into RAMs 43 and 243 while confirming if the operation of storing is carried out without an error.

Next, the main CPUs 41 and 241 each checks what connects to the IDE bus. Then, the main CPUs 41 and 241 access, via the IDE buses, to the memory cards 53 and 263 inserted into the card slots 53S and 263S, and read out game programs and game system programs from the memory cards 53 and 263, respectively. In this case, the main CPUs 41 and 241 each reads out four bytes of data constituting the game program and the game system program at one time. Next, according to the authentication programs stored in the RAMs 43 and 243, the main CPUs 41 and 241 authenticate the game program and the game system program read out to confirm and prove that these programs are not modified (S5).

When the authentication properly ends, the main CPUs 41 and 241 write and store the authenticated game programs and game system programs in RAMs 43 and 243 (S6).

Next, the main CPUs 41 and 241 access, via the PCI buses, to the GALs 54 and 264 attached to the IC socket 54S 264S, and read out payout rate setting data from the GALs 54 and 264, respectively. The payout rate setting data read out is then written and stored in the RAMs 43 and 243 (S7).

Next, the main CPUs 41 and 241 read out, via the PCI buses, country identification information stored in the ROMs 55 and 265 of the gaming boards 50 and 265, respectively. The country identification information read out is then stored in the RAMs 43 and 243 (S8).

Figure 14:
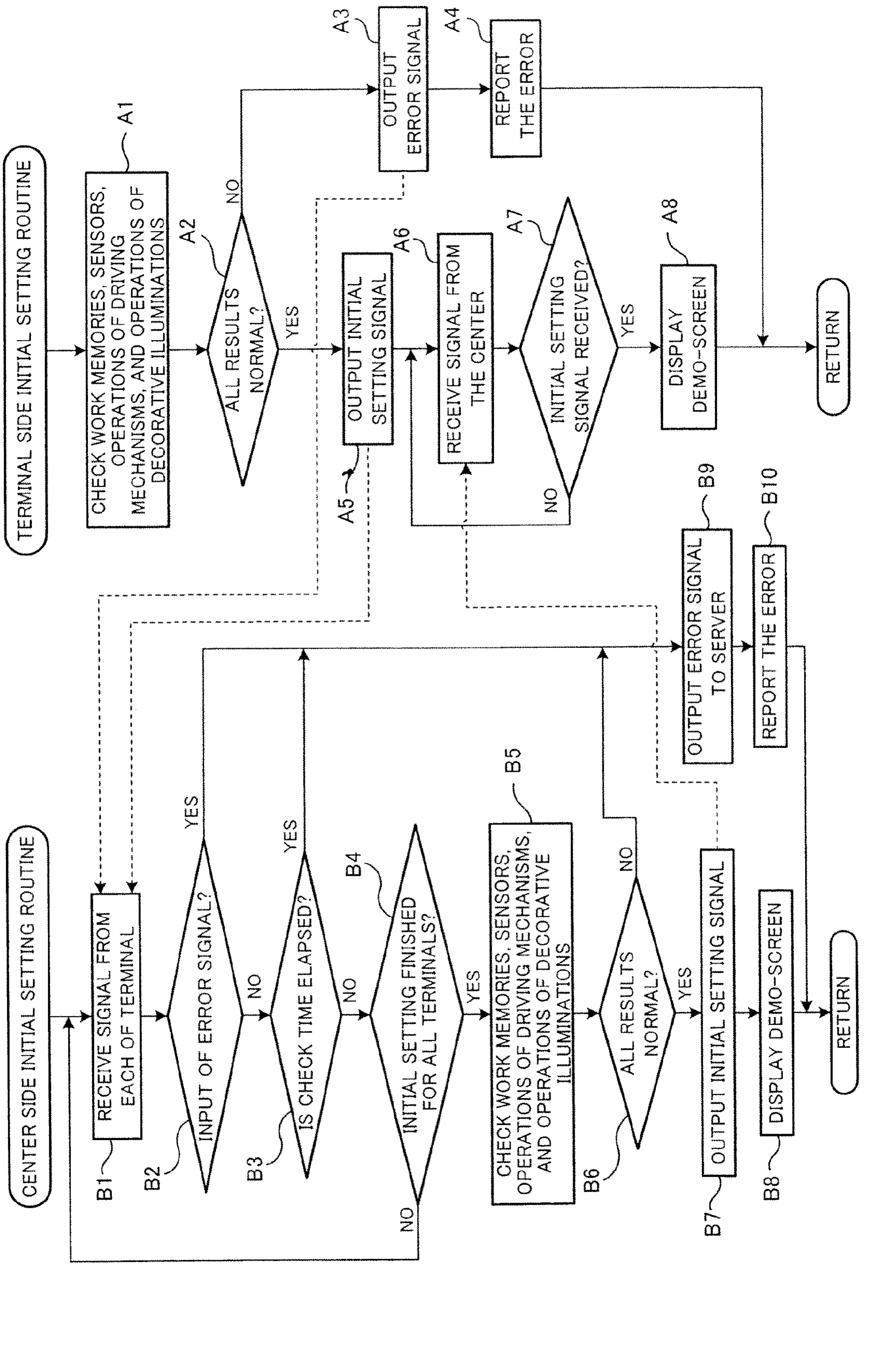
FIG. 14 is a flowchart illustrating an initial process executed by the gaming terminal and the center controller.

After this, the main CPUs 41 and 241 each perform an initial process of FIG. 14.

[Operation of Gaming Machine 1: Initial Process]

Figure 13:
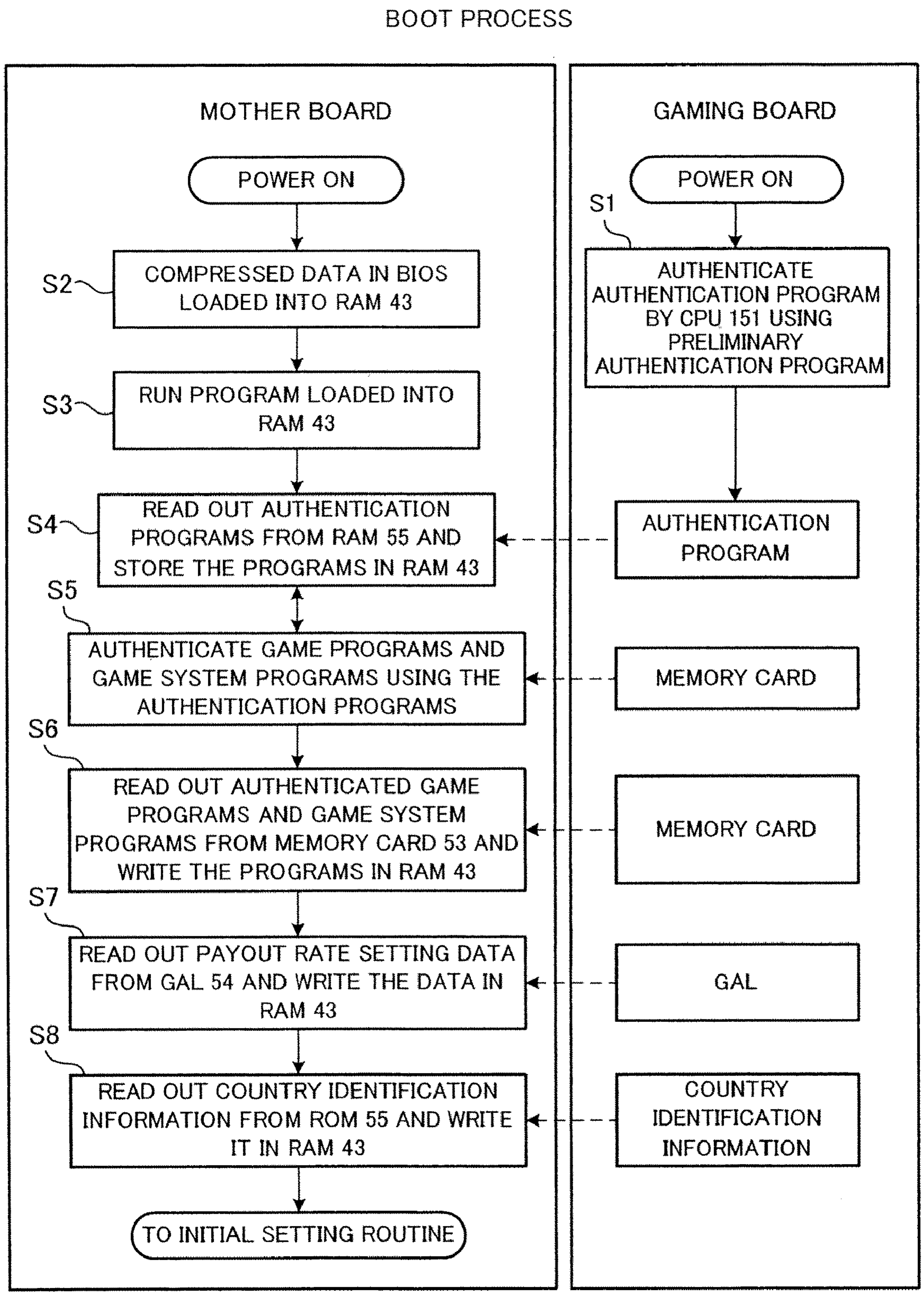
FIG. 13 is a flowchart illustrating a boot process executed by the gaming terminal and the center controller.

The following describes an initial process which takes place in the gaming machine 1. When the boot process of FIG. 13 is completed, the center controller 200 reads out from the RAM 243 a center side initial setting routine illustrated in FIG. 14 and executes the routine. Meanwhile, the gaming terminal 10 reads out from the RAM 43 a terminal side initial setting routine illustrated in FIG. 14 and executes the routine. The center side and terminal side initial setting routines are executed in parallel.

First, the main CPU 41 of each of the gaming terminals 10 checks operations of work memories such as the RAM 43, various sensors, various driving mechanisms, and various decorative illuminations (A1). Then, the main CPU 41 determines if all the check results are normal (A2). If the main CPU 41 determines that the check results contains an error (A2: NO), the main CPU 41 outputs a signal notifying the error (hereinafter, error signal) to the center controller 200 (A3). Further, the main CPU 41 reports the error in the form of illuminating the lamp 30 or the like (A4), and then ends the routine.

On the other hand in A2, if the main CPU 41 determines that all the check results are normal (A2: YES), an initial setting signal is output to the center controller 200 (A5). Then, an initial setting signal is waited from the center controller 200 (A6, A7: NO).

The main CPU 241 of the center controller 200 receives signals from each of the terminals (B1). Then, the main CPU 241 determines whether a signal received is an error signal (B2). If the main CPU 241 determines that the signal is an error signal (B2: YES), the main CPU 241 outputs the error signal to a server of a not-shown host computer or the like (B9) to report the error (B10), and ends the routine.

On the other hand in B2, if the main CPU 241 determines that the signal is not an error signal (B2: NO), the main CPU 241 determines whether a predetermined time (check time) has elapsed from the time of powering on (B3). If the main CPU 241 determines that the check time has elapsed (B3: YES), B9 is executed. On the other hand, if the main CPU 241 determines that the check time has not yet elapsed (B3: NO), it is determined whether an initial setting signal is received from each of the gaming terminals 10 (B4). If the main CPU 241 determines that an initial setting signal from any one of the gaming terminals 10 is not received (B4: NO), the process returns to B1. On the other hand, if it is determined that initial setting signals from all the gaming terminals 10 are received (B4: YES), the main CPU 241 checks operations of work memories such as RAM 243, various sensors, various driving mechanisms, and various decorative illuminations (B5). Then, the main CPU 241 determines whether all the check results are normal (B6). If the main CPU 241 determines the check results contain an error (B6: NO), the main CPU 241 executes B9.

On the other hand in B6, if the main CPU 241 determines that all the check results are normal (B6: YES), the main CPU 241 outputs an initial setting signal to all the gaming terminals 10 (B7), and causes the shared display 102 to display a demo-screen (B8) Then, the main CPU 241 ends the routine.

In A7, the main CPU 41 of each of the gaming terminals 10 determines that an initial setting signal is received from the center controller 200 (A7: YES), and causes the terminal display 101 to display a demo-screen (A7). The main CPU 41 then ends the routine.

(Operation of Gaming Terminal 10: Terminal Process Routine)

Figure 15:
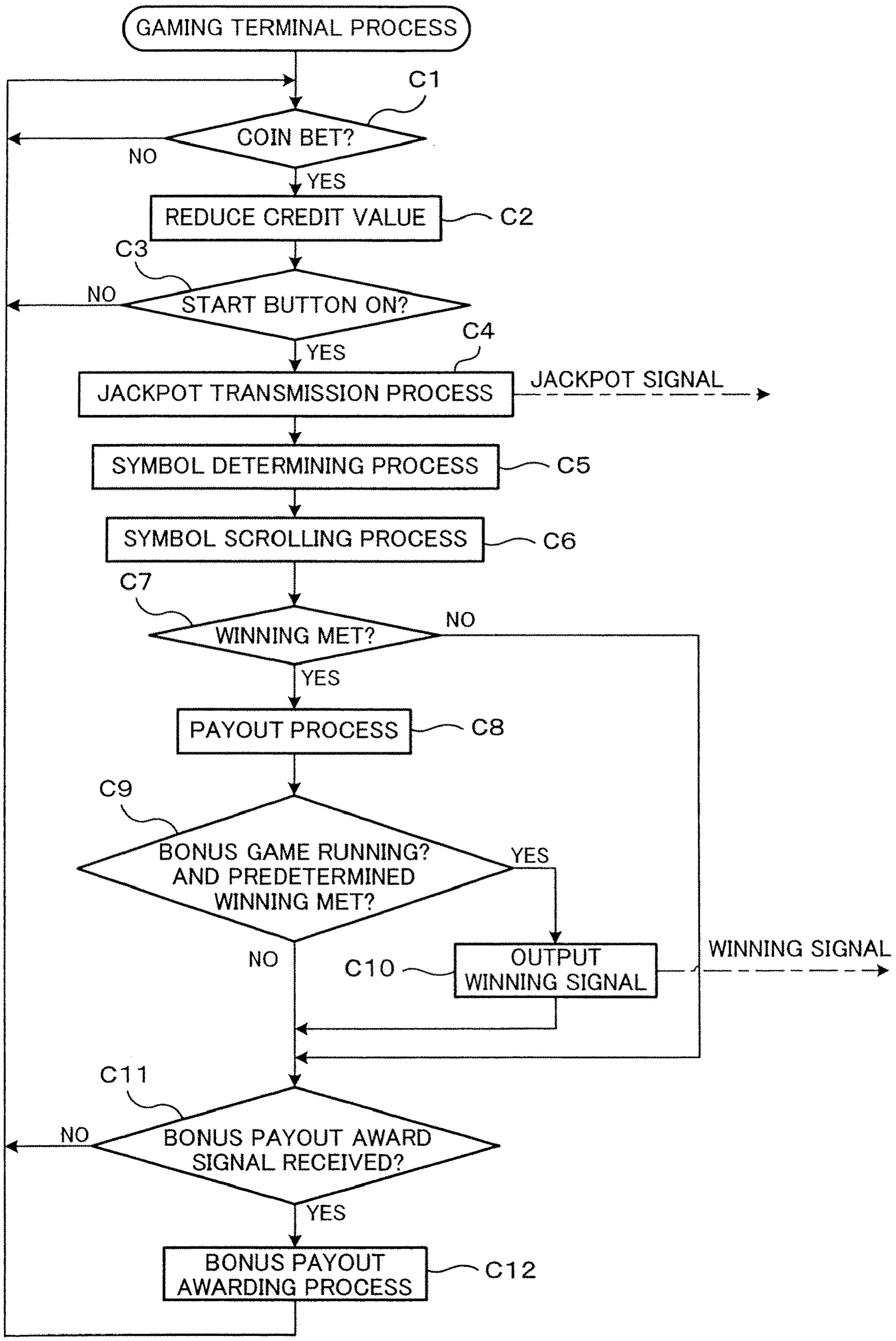
FIG. 15 is a flowchart illustrating a terminal process routine executed in the gaming terminal.

After the terminal side initial setting routine of FIG. 14, the main CPU 41 of the gaming terminal 10 performs a terminal process routine of FIG. 15. Through this terminal process routine, a game is run.

As illustrated in FIG. 15, in the terminal process routine, it is determined whether a coin is bet (C1). In this step, it is determined whether a signal from the 1-BET switch 26S entered by pressing of the 1-BET button 26 is received. Meanwhile, it is determined whether a signal from the maximum BET switch 27S entered by pressing of the maximum BET button 27 is received. If no coin is BET (C1: NO), C1 is repeated until a coin is bet.

On the other hand, if a coin is bet (C1: YES), the credit value stored in the RAM 43 is reduced according to the number of coins bet (C2). When the number of coins bet surpasses the number of coins equivalent to the credit value stored in the RAM 43, C2 is repeated without the reduction of the credit value. When the number of coins bet exceeds the maximum number of coins bettable one game (50 pieces in this embodiment), the process goes to a later-described step C3 without the reduction of the credit value.

Then, it is determined whether a spin button 23 is pressed (C3). If the spin button 23 is not pressed (C3: NO), the process returns to C1. Here, if the spin button 23 is not pressed (for example, the spin button 23 is not pressed but a command to end the game is input), the reduction of the credit value in C2 is canceled.

On the other hand, if the spin button 23 is pressed (C3: YES), a jackpot transmission process is executed (C4). In other words, a jackpot signal indicating a part of the game value bet is transmitted to the center controller 200.

Next executed is a symbol determining process (C5). That is, the stop symbol determining program stored in the RAM 43 is run to determine symbols 180 to be arranged in the matrix 156. Through this, a symbol combination to be formed along the payline L is determined.

Then, the scrolling process is executed to scroll symbols 180 on the terminal display 101 (C6). The scrolling process is a process in which the symbols 180 determined in C5 are stopped (rearranged) in the matrix 156 after scrolling of symbols 180 in a direction indicated by an arrow symbol.

Next, it is determined whether symbols 180 rearranged in the matrix 156 form a winning combination (C7). If the symbols 180 form a winning combination (C7: YES), a payout process is executed (C8). More specifically, when a winning combination is formed, the number of coins according to the combination is calculated. On the other hand in C7, if it is determined that no winning combination is formed (C7: NO), C11 is executed.

After the execution of the payout process in C8, the main CPU 41 determines whether a bonus game is running and whether a predetermined winning is met (C9). If a bonus game start signal is received from the center controller 200, the main CPU 41 determines that the bonus game is running. If it is determined that the bonus game is running and a predetermined winning is met (C9: YES), a winning signal is output to the center controller 200 (C10) and the process of C11 is executed. On the other hand, if it is determined that the bonus game is not running or a predetermined winning is not met (C9: NO), the process of C11 is executed.

Next, the main CPU 41 determines whether a bonus award signal is received from the center controller 200 (C11). If the main CPU 41 determines that a bonus award signal is received (C11: YES), a payout is awarded according to the bonus award signal (C12). The process then returns to C1. On the other hand in C11, if the main CPU 41 determines that no bonus award signal is received (C11: NO), the process returns to C1.

(Operation of Center Controller 200: Center Process Routine)

Figure 16:
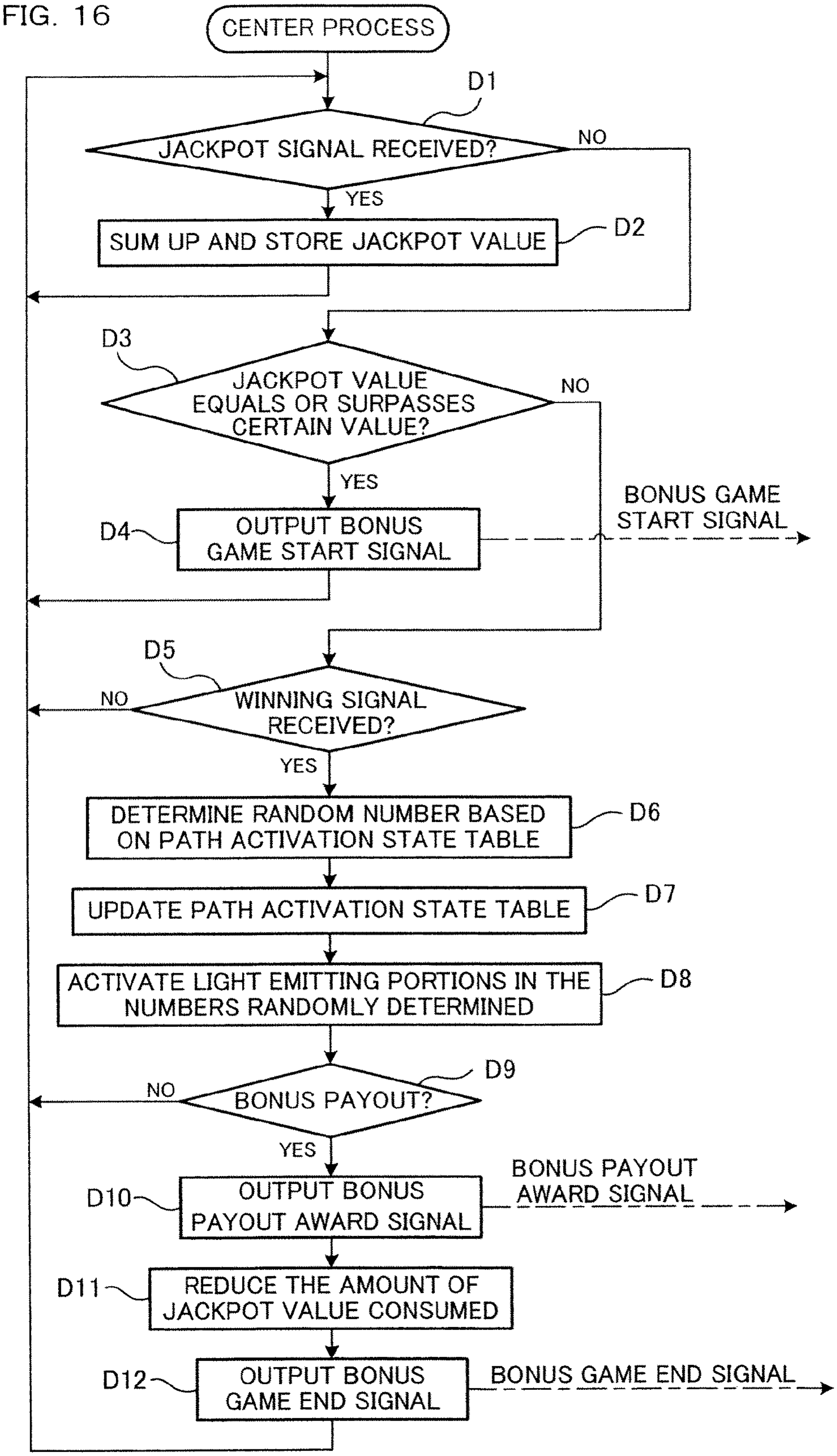
FIG. 16 is a flowchart illustrating a center process routine executed in the center controller.

After the center side initial setting routine of FIG. 14, the main CPU 241 of the center controller 200 executes a center process routine of FIG. 16. The main CPU 241 performs the center process routine to run a bonus game.

As illustrated in FIG. 16, in the center process routine, the main CPU 241 determines whether a jackpot signal is received from a gaming terminal 10 (D1). If it is determined that a jackpot signal is received (D1: YES), the game value indicated by the jackpot signal is stored cumulatively (D2). The process then returns to D1.

On the other hand in D1, if the main CPU 241 determines no jackpot signal is received (D1: NO), the main CPU 241 determines if the jackpot value equals or surpasses a predetermined value (D3). If it is determined that the jackpot value equals or surpasses a predetermined value (D3: YES), a bonus game start signal is output to each gaming terminal 10 (D4). Then, the process of D1 is executed.

If it is determined that the jackpot value does not equal or surpass a predetermined value (D3: NO), the main CPU 241 determines whether a winning signal is received from the terminal controller 100 (D5). If the main CPU 241 determines that a winning signal is not received (D5: NO), the process returns to D1. On the other hand, if it is determined that a winning signal is received (D5: YES), a random number is determined based on the path activation state table (D6). Then, the main CPU 241 updates the path activation state table based on the random number so determined (D7). The main CPU 241 then activates the light emitting portions 303 toward the bonus payout indicator 300, in numbers randomly determined as above (D8).

Then, it is determined whether a path 301 exists in which the light emitting portions 303 have been activated up to the bonus payout indicator 300, so as to determine whether conditions are met for awarding a bonus payout (D9). If it is determined that conditions for awarding a bonus payout are not met (D9: NO), the process returns to D1. On the other hand, if it is determined that conditions for awarding a bonus payout are met (D9: YES), a bonus award process is executed to award a bonus payout, and a bonus award signal is output to the gaming terminal 10 subject to the bonus payout (D10). Then, the amount of jackpot value consumed is reduced from the RAM243 (D10), and a bonus game end signal is output to each gaming terminal 10 (D11). The process then returns to D1.

In this manner, a base game is run in each gaming terminal 10, independently from the other gaming terminals 10, and the payout according to a predetermined winning is awarded. Based on a predetermined condition, a bonus game is run that is configured to award a bonus payout more rewarding than the payout awarded in the base game. Every time a predetermined winning is met in a gaming terminal 10, a random number of the light emitting portions are activated toward the bonus payout indicator 300 in the path 301 corresponding to the gaming terminal 10 in which the winning has occurred. A bonus payout is awarded in the gaming terminal 10 corresponding to the path 301 including the light emitting portions 303 that were activated all the way up to the bonus payout indicator 300. Because the light emitting portions 303 turn active toward the bonus payout indicator 300 in random numbers when a predetermined winning is met, the players cannot easily predict which path 301 contains the light emitting portions 303 that reach the bonus payout indicator 300 first by activation. That is, a new kind of entertainment is provided.

In this manner, a base game is run in each gaming terminal 10, independently from the other gaming terminals 10, and the payout according to a predetermined winning is awarded. Based on a predetermined condition, a bonus game is run that is configured to award a bonus payout more rewarding than the payout awarded in the base game. A random number of light emitting portions 303 are activated toward the bonus payout indicator 300 in a path 301 corresponding to the gaming terminal in which a predetermined winning has occurred, every time the predetermined winning is met in the gaming terminals 10, such that the predetermined number of winnings required to activate the light emitting portions 303 up to the bonus payout indicator 300 is the same for all paths 301. A bonus payout is awarded in the gaming terminal 10 corresponding to the path 301 including the light emitting portions 303 that were activated all the way up to the bonus payout indicator 300. Because the light emitting portions 303 turn active toward the bonus payout indicator 300 in random numbers when a predetermined winning is met, the players cannot easily predict which path 301 contains the light emitting portions 303 that reach the bonus payout indicator 300 first by activation. That is, a new kind of entertainment is provided. Further, because the light emitting portions turn active in random numbers such that the predetermined number of winnings required to activate the light emitting portions up to the bonus payout indicator is the same for all paths, the difficulty of activating the light emitting portions to the bonus payout indicator (winning percentage of a bonus game) is perceived as being different in each path, while it is actually the same for all paths. That is, a new kind of entertainment is provided.

In this manner, a base game is run in each gaming terminal, independently from the other gaming terminals, and the payout according to a predetermined winning is awarded. Based on a predetermined condition, a bonus game is run that is configured to award a bonus payout more rewarding than the payout awarded in the base game. Every time a predetermined winning is met in a gaming terminal, a random number of the light emitting portions are activated toward the bonus payout indicator in the path corresponding to the gaming terminal in which the winning has occurred. A bonus payout is awarded in the gaming terminal corresponding to the path including the light emitting portions that were activated all the way up to the bonus payout indicator. Because the light emitting portions turn active toward the bonus payout indicator in random numbers when a predetermined winning is met, the players cannot easily predict which path contains the light emitting portions that reach the bonus payout indicator first by activation. That is, a new kind of entertainment is provided. Further, because more than one light emitting portion 303 is disposed along the width direction of the path, the light emitting portions can be activated in a wide variety of patterns. That is, a new kind of entertainment is provided.

The foregoing described an embodiment of the present invention. The present invention, however, is not limited to the embodiment described above. Another embodiment of the invention is also possible, as described below. The following will describe a base game in a gaming machine according to another embodiment of the present invention.

Figure 17:
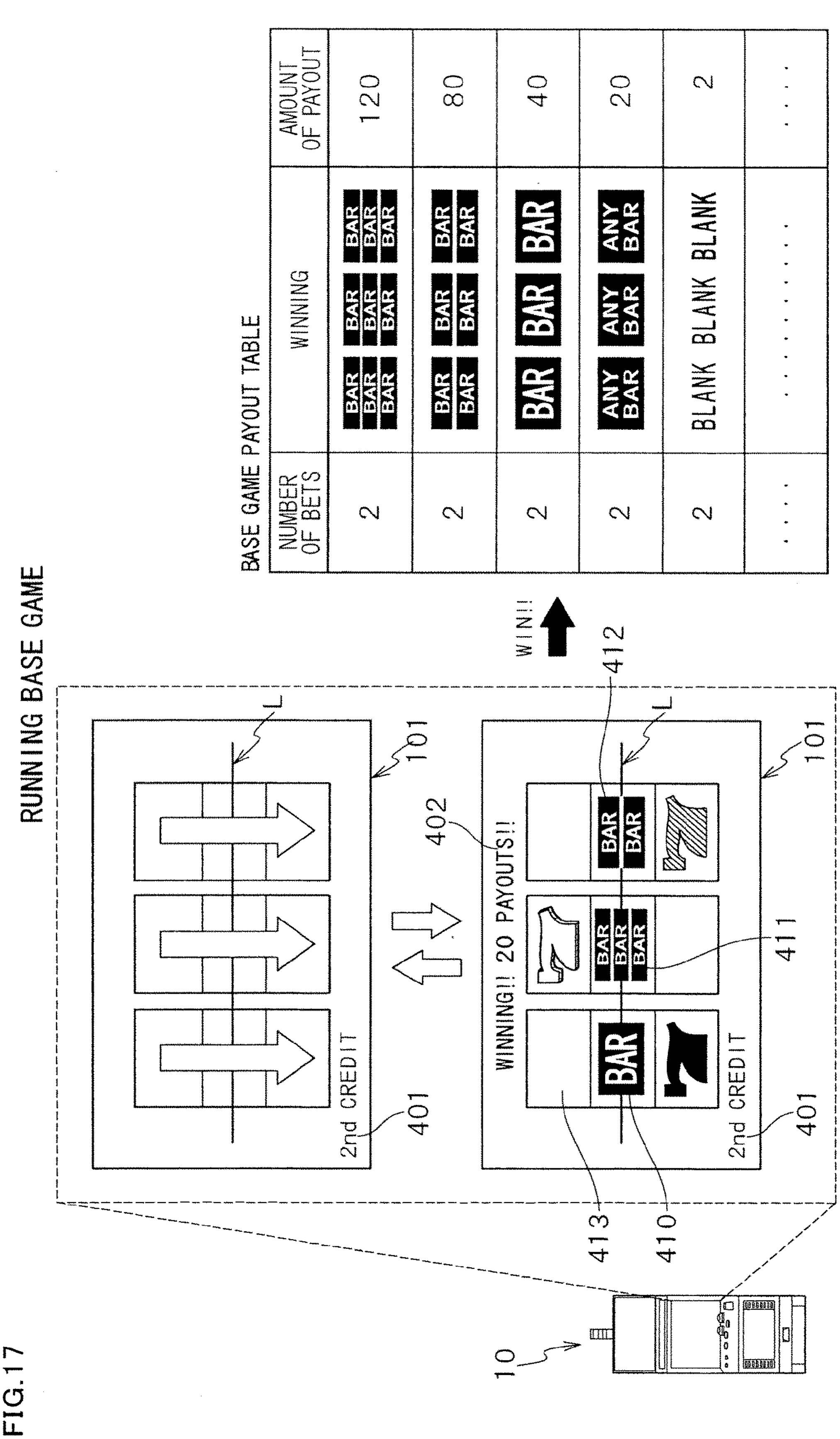
FIG. 17 is an explanatory diagram concerning a base game in a gaming machine according to another embodiment of the present invention.

A terminal display 101 according to another embodiment includes arrangement areas having three rows and three columns, as shown in FIG. 17. The arrangement areas in the middle row make up the payline L. When a predetermined winning is met by the relation between the symbols rearranged in the payline L, a payout is awarded according to the winning combination. The terminal display 101 displays a credit 401 indicative of the game value bet.

In the example shown in FIG. 17, the credit 401 indicates "2nd CREDIT", meaning that the game value bet is equivalent of two coins. As a result of symbol rearrangement, symbols 410, 411, and 412 are rearranged as "1BAR", "3BAR", and "2BAR", respectively, in the payline L. These symbols make "ANY-BAR" "ANY-BAR" "ANY-BAR", which is a winning combination for credit 401 equivalent of two coins. As a payout for this winning, twenty coins are awarded.

FIG. 18 is a diagram showing a base game payout table. The base game payout table is used when the main CPU 41 determines a winning in a base game, and when the main CPU 41 awards a payout according to the winning. The base game payout table contains fields for the number of bets, winning, and the amount of payout. In the field for the number of bets, the number of coins bet is shown. In the field for winning, combinations of symbols rearranged in the payline L are shown, which are conditions necessary for meeting a winning. The field for the amount of payout shows the number of coins paid out when a winning is met. An example shown in FIG. 18 is described below. When the symbols "3BAR" "3BAR" "3BAR" are rearranged in the payline L, the amount of payout is 60 when the number of bet is 1, and 120 when the number of bet is 2. When the symbols "2BAR" "2BAR" "2BAR" are rearranged in the payline L, the amount of payout is 40 when the number of bet is 1, and 80 when the number of bet is 2. When the symbols "1BAR" "1BAR" "1BAR" are rearranged in the payline L, the amount of payout is 20 when the number of bet is 1, and 40 when the number of bet is 2. When the symbols "ANY-BAR" "ANY-BAR" "ANY-BAR" are rearranged in the payline L, the amount of payout is 10 when the number of bet is 1, and 20 when the number of bet is 2. When the symbols "BLANK" "BLANK" "BLANK" are rearranged in the payline L, the amount of payout is 1 when the number of bet is 1, and 2 when the number of bet is 2. When the symbols "Blue 7" "Blue 7" "Blue 7" are rearranged in the payline L, the amount of payout is 1800 when the number of bet is 3. When the symbols "Red 7" "Red 7" "Red 7" are rearranged in the payline L, the amount of payout is 100 when the number of bet is 3. When the symbols "ANY-7" "ANY-7" "ANY-7" are rearranged in the payline L, the amount of payout is 100 when the number of bet is 3. In this manner, the amount of payout awarded when a winning is met increases as the number of bets is increased. This can increase the game value (number of bets) made by players.

In the following, description is made as to a bonus game in a gaming machine according to another embodiment of the present invention. In a bonus game according to another embodiment, points are awarded that reflect a predetermined winning. The light emitting portions 303 are activated toward the bonus payout indicator 300, in numbers based on a sum of the points awarded.

Figure 19:
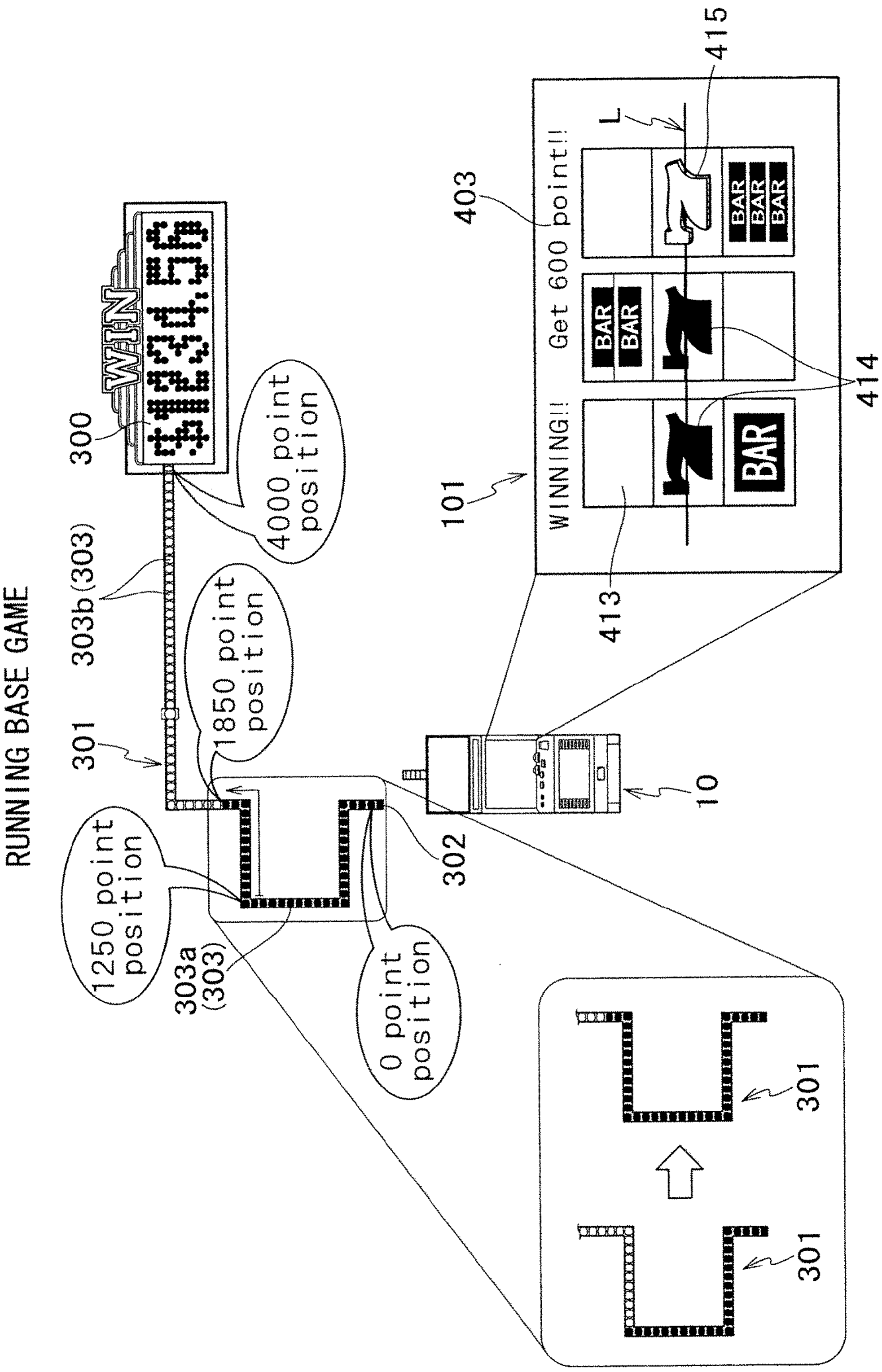
FIG. 19 is an explanatory diagram concerning a bonus game in a gaming machine according to another embodiment of the present invention.

This is described below based on the example shown in FIG. 19. The position 302 corresponding to the gaming terminal 10 has an associated value of 0 point, and the position at the bonus payout indicator 300 has an associated value of 4000 points. In the gaming terminal 10, 1250 points have been awarded and accumulated, and the light emitting portions 303 in the path 301 have been activated up to the position corresponding to 1250 points. Here, winnings are met by the rearrangement of symbol 414, symbol 414, and symbol 415 as "Red 7", "Red 7", and "Blue 7", respectively, in the pay line L. Three winning are met. Rearrangement of the symbols 414 in the payline L makes two winnings, and rearrangement of the symbol 415 in the payline L makes one winning. The payout for the winning met by each symbol 414 is 150 points, and the payout for the winning met by the symbol 415 is 300 points. Accordingly, the three winnings make a total payout of 600 points. Awarding 600 points to the gaming terminal 10 makes the cumulative points of 1250+600=1850 points. As a result, the light emitting portions 303 are activated to the position corresponding to 1850 points. In this manner, during a bonus game, points are awarded according to a predetermined winning, and a jackpot is awarded when the points accumulate to a predetermined value (4000 points).

FIG. 20 is a diagram showing a bonus game payout table. The bonus game payout table is used when the main CPU 41 determines a winning in a bonus game, and when the main CPU 241 awards payout points according to the winning. The bonus game payout table contains fields for winning and payout points. In the field for winning, combinations of symbols rearranged in the payline L are shown, which are conditions necessary for meeting a winning. The field for payout points indicates the number of points paid out when a winning is met. This is described below based on the example shown in FIG. 20. When symbols "Blue 7" "Blue 7" "Blue 7" are rearranged in the payline L, 7000 points are paid out. When a symbol "Blue 7" is rearranged in the payline L, 300 points are paid out. When a symbol "Red 7" is rearranged in the payline L, 150 points are paid out. When a symbol "3BAR" is rearranged in the payline L, 30 points are paid out. When a symbol "2BAR" is rearranged in the payline L, 20 points are paid out. When a symbol "1BAR" is rearranged in the payline L, 10 points are paid out.

The foregoing described a gaming machine according to another embodiment of the present invention. In a gaming machine according to yet another embodiment of the present invention, a bonus game is started when the accumulated jackpot value surpasses a certain value (for example, a fixed value of $200). However, the invention is not limited to this example. For example, the gaming machine may be adapted so that the threshold jackpot value triggering the bonus game is varied at random within a predetermined range (for example, $200 to $300) for each bonus game.

In yet another embodiment of the present invention, the gaming machine is described that is configured to award a jackpot when the awarded points have accumulated to a predetermined value. However, the invention is not limited to this example. For example, the gaming machine may be adapted so that the threshold accumulated value for awarding a jackpot is varied at random within a predetermined range (for example, 3000 to 5000 points) for each bonus game.

The gaming machine may be configured so that any value can be selected and set for the points required to award a jackpot in the gaming terminal. Specifically, in the gaming machine, the points required to award a jackpot may be selected from externally input values (for example, selection from 3000 points, 4000 points, and 5000 points).

In another embodiment of the present invention, the gaming machine may be adapted so that the difficulty of activating the light emitting portions to the bonus payout indicator (winning percentage of a bonus game), which is the same for all paths, is set according to the contribution of each gaming terminal to a jackpot.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes performed in the steps or blocks, these processes are essentially executed by various devices. Further, the other structures necessary for the steps or blocks are obvious from the above descriptions.

What is claimed is:

1. A gaming machine capable of running a base game configured to award a payout according to a predetermined winning and a bonus game configured to award a bonus payout, comprising:

a plurality of gaming terminals, each including a terminal controller programmed to perform operations (c1) and (c2);

a bonus payout indicator that displays the bonus payout;

a plurality of paths, respectively corresponding to the gaming terminals, each path including a plurality of light emitting portions arranged to foam a channel extending from a corresponding one of the gaming terminals to the bonus payout indicator; and a center controller programmed to perform operations (d1) through (d3), the terminal controller in each gaming terminal (c1) running the base game independently from the other gaming terminals and awarding the payout according to a predetermined winning, and (c2) awarding the bonus payout based on an instruction from the center controller, and the center controller (d1) running the bonus game in each gaming terminal based on a predetermined condition, and awarding to any of the gaming terminals a light emitting portion activating condition for activating a random number of the light emitting portions in a corresponding one of the paths, wherein the random number is determined such that each gaming terminal needs the same number of light emitting portion activating conditions to activate all of the light emitting portions in its corresponding path, (d2) activating the random number of the light emitting portions toward the bonus payout indicator in a path corresponding to a gaming terminal to which the light emitting portion activating condition is awarded, and (d3) instructing the terminal controller of the gaming terminal, corresponding to a path in which all the light emitting portions are turned active, to award the bonus payout.

2. A gaming machine capable of running a base game configured to award a payout according to a predetermined winning and a bonus game configured to award a bonus payout, comprising:

a plurality of gaming terminals, each including a terminal controller programmed to perform operations (e1) and (e2);

a bonus payout indicator that displays the bonus payout;

a plurality of paths, respectively corresponding to the gaming terminals, each path including a plurality of light emitting portions arranged lengthwise and widthwise along the path to form a channel extending from a corresponding one of the gaming terminals to the bonus payout indicator; and a center controller programmed to perform operations (f1) through (f3), the terminal controller in each gaming terminal (e1) running the base game independently from the other gaming terminals and awarding the payout according to a predetermined winning, and (e2) awarding the bonus payout based on an instruction from the center controller, and the center controller (f1) running the bonus game in each gaming terminal based on a predetermined condition, and awarding to any of the gaming terminals a light emitting portion activating condition for activating a random number of the light emitting portions in a corresponding one of the paths, wherein the random number is determined such that each gaming terminal needs the same number of light emitting portion activating conditions to activate all of the light emitting portions in its corresponding path, (f2) activating the random number of the light emitting portions toward the bonus payout indicator in a path corresponding to a gaming terminal to which the light emitting portion activating condition is awarded, and (f3) instructing the terminal controller of the gaming terminal, corresponding to a path in which all the light emitting portions are turned active, to award the bonus payout.

3. A playing method of a gaming machine capable of running a base game configured to award a payout according to a predetermined winning and a bonus game configured to award a bonus payout, the gaming machine including a plurality of gaming terminals, a bonus payout indicator that displays the bonus payout;

a plurality of paths, respectively corresponding to the gaming terminals, each path including a plurality of light emitting portions arranged to form a channel extending from a corresponding one of the gaming terminals to the bonus payout indicator; and a center controller, the method comprising the steps of:

(g1) running the base game independently from the other gaming terminals and awarding the payout according to a predetermined winning;

(g2) awarding the bonus payout based on an instruction from the center controller;

(g3) running the bonus game in each gaming terminal based on a predetermined condition, and awarding to any of the gaming terminals a light emitting portion activating condition for activating a random number of the light emitting portions in a corresponding one of the paths, wherein the random number is determined such that each gaming terminal needs the same number of light emitting portion activating conditions to activate all of the light emitting portions in its corresponding path, (g4) activating the random number of light emitting portions toward the bonus payout indicator in a path corresponding to a gaming terminal to which the light emitting portion activating condition is awarded, and (g4) instructing the terminal controller of the gaming terminal, corresponding to a path in which all the light emitting portions are turned active, to award the bonus payout.

4. The gaming machine according to claim 1, wherein each of the plurality of gaming terminals has an image display panel; and the image display panel displays an image indicating whether there is a payout according to the predetermined winning in the base game, and whether the light emitting portion activating condition is awarded in the bonus game.

5. The gaming machine according to claim 1, wherein for each of the gaming terminals, the number of light emitting portions disposed in the corresponding one of the paths is determined according to the distance between the gaming terminal and the bonus payout indicator.

6. The gaming machine according to claim 2, wherein each of the plurality of gaming terminals has an image display panel; and the image display panel displays an image indicating whether there is a payout according to the predetermined winning in the base game, and whether the light emitting portion activating condition is awarded in the bonus game.

7. The gaming machine according to claim 2, wherein for each of the gaming terminals, the number of light emitting portions disposed in the corresponding one of the paths is determined according to the distance between the gaming terminal and the bonus payout indicator.

* * * * *